United States Patent [19]
Smith

[11] 4,023,403
[45] May 17, 1977

[54] METHOD AND APPARATUS FOR TIMING DIESEL ENGINES

[75] Inventor: Richard Lawrence Smith, Livonia, Mich.

[73] Assignee: Scans Associates, Inc., Livonia, Mich.

[22] Filed: July 11, 1975

[21] Appl. No.: 595,019

[52] U.S. Cl. .................................................. 73/119 A
[51] Int. Cl.² ................................................. G01M 15/00
[58] Field of Search .................... 73/119 A, 117.3; 324/16 T

[56] References Cited

UNITED STATES PATENTS

| | | | |
|---|---|---|---|
| 3,344,663 | 10/1967 | Dreisin et al. | 73/119 A |
| 3,503,255 | 3/1970 | Germann et al. | 73/119 A X |
| 3,698,249 | 10/1972 | Weaver | 73/119 A X |

Primary Examiner—Jerry W. Myracle
Attorney, Agent, or Firm—D. Edward Dolgorukov

[57] ABSTRACT

The specification discloses an improved method and apparatus for determining the time angle of a diesel engine which, in contrast to the present day method, is one which is fast, accurate, and can be readily used on a production line basis. There is disclosed a method and apparatus which, by the utilization of pulses of fixed angular frequency produced by an encoder, and counted between the moment the pressure in the injector line of the cylinder, whose timing angle you are measuring, reaches a predetermined pressure and the moment the piston in the same cylinder reaches top dead center, a number of pulses representing the timing angle of the engine is obtained, which can easily be converted into a reading of the timing angle.

The pulses are essentialy counted by producing a signal when the pressure in the injector line reaches a certain predetermined value, after which time all other pressure signals are locked out in a predetermined manner, with the count of pulses being stopped when the next top dead center signal occurs. By providing a lockout period based on degrees of crankshaft rotation for all timing applications, except where the engine being timed in intended to be run at a constant speed, a production diesel engine timing system is provided which gives accurate results, regardless of the speed of the diesel engine, in an accurate and reliable manner.

49 Claims, 25 Drawing Figures

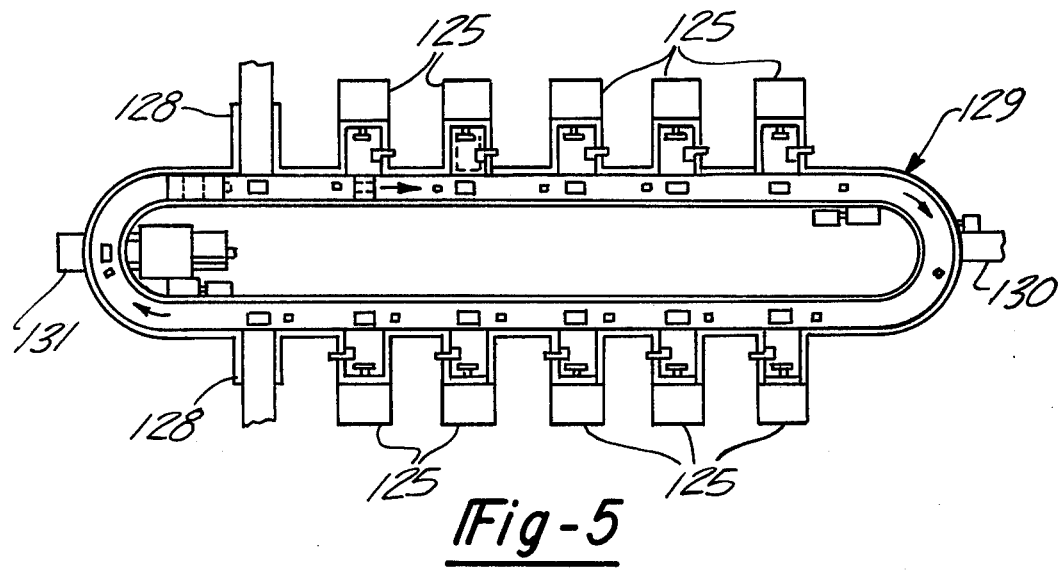
Fig-5
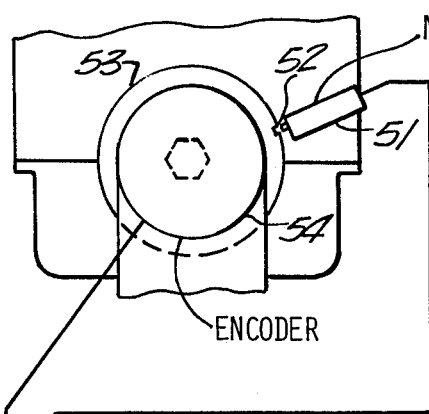
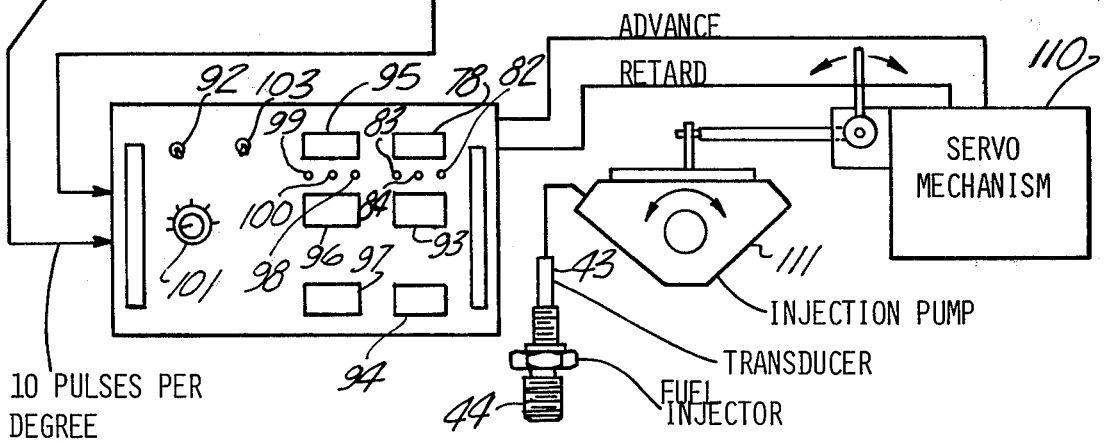
Fig-6

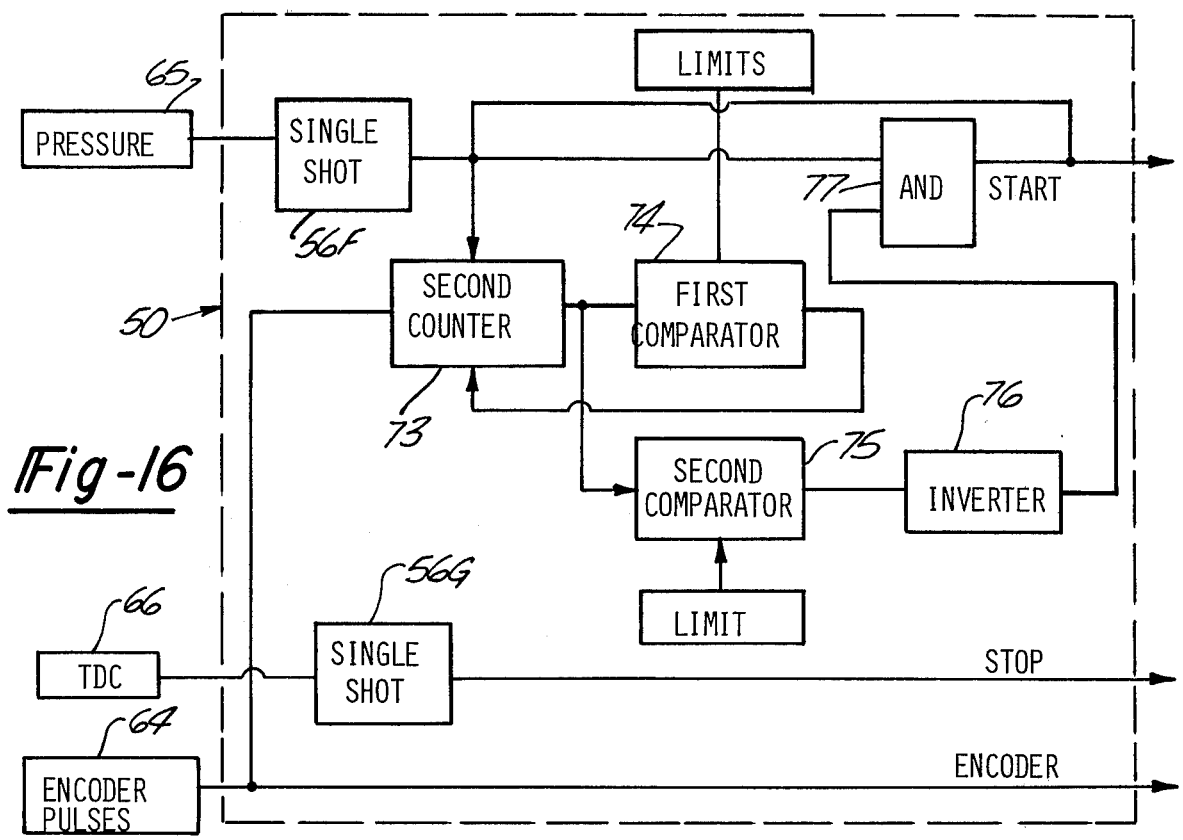
_Fig-16_
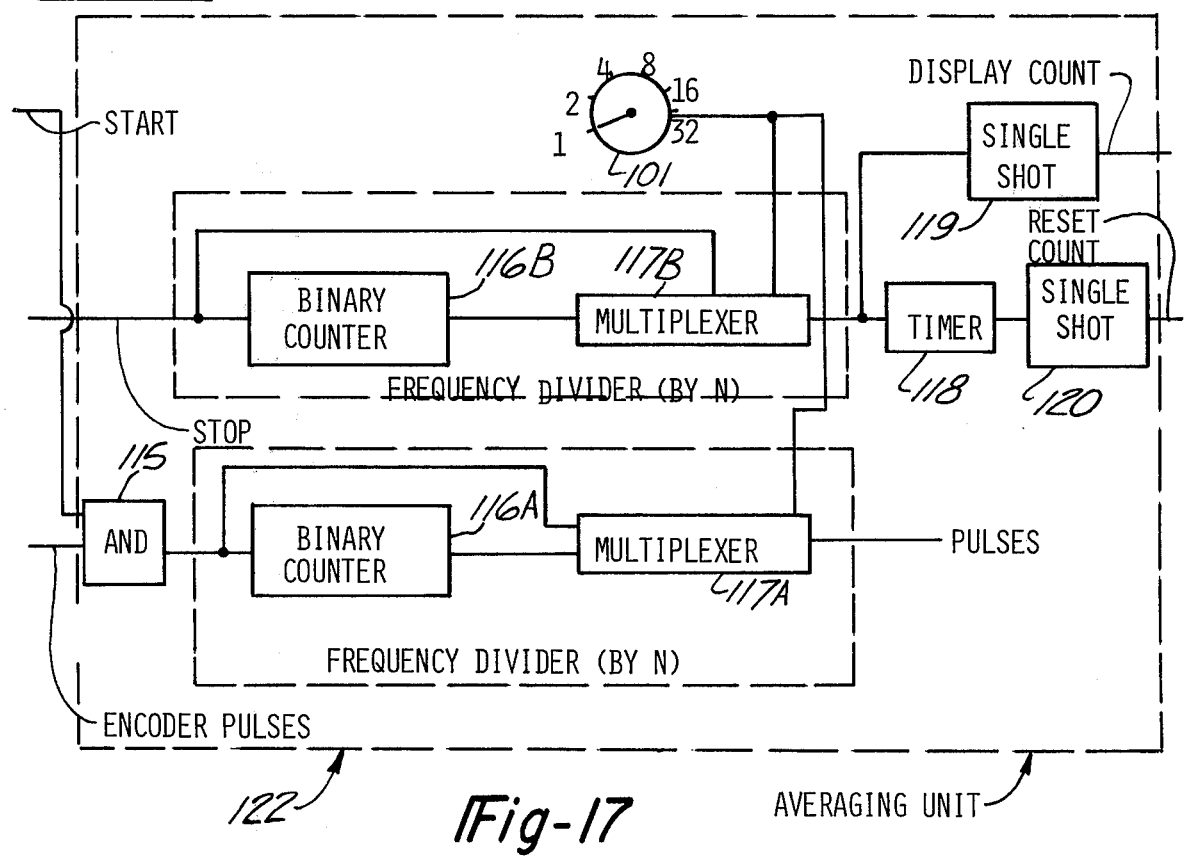
_Fig-17_

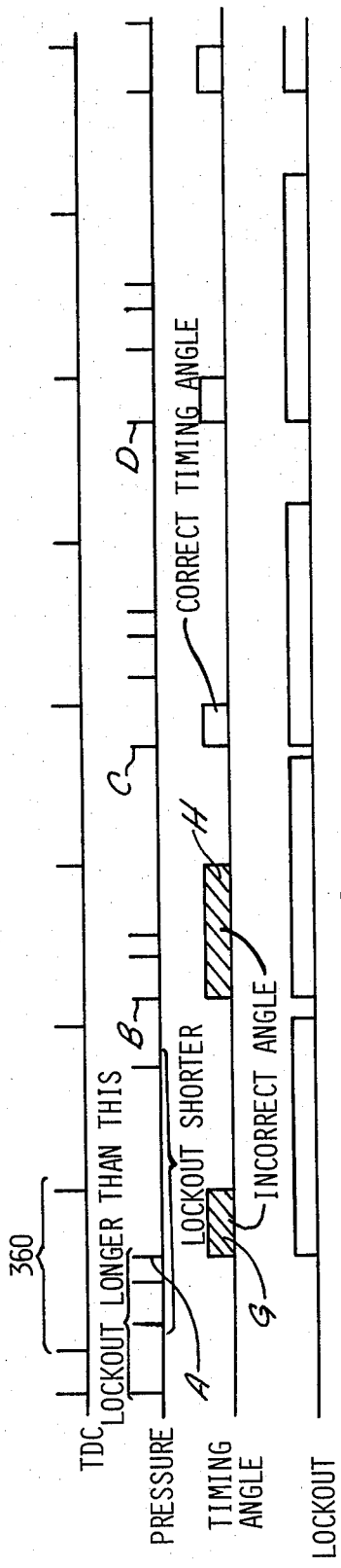
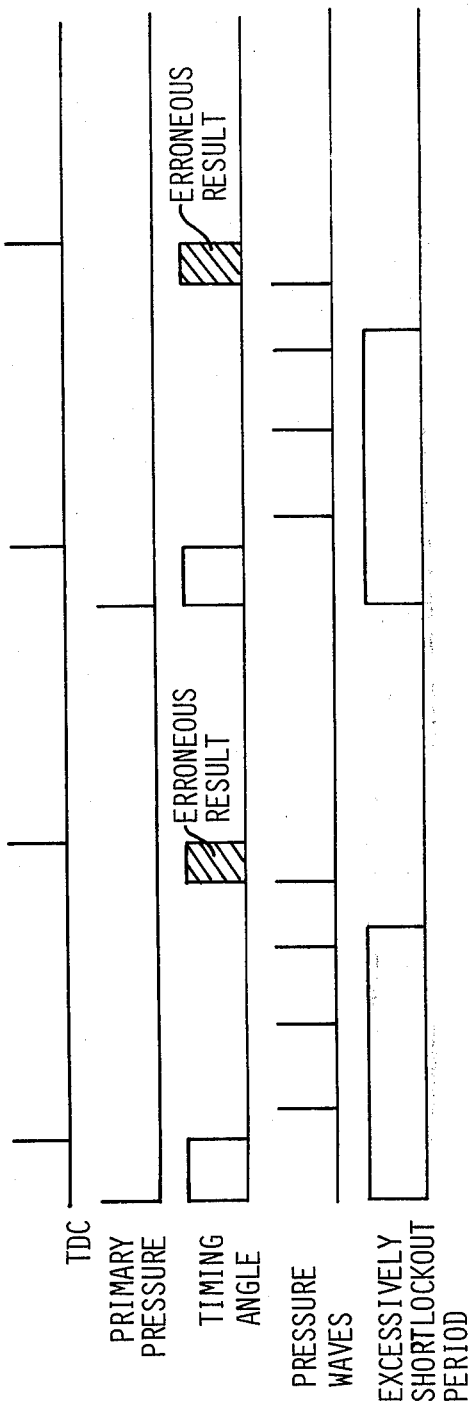
Fig-18
Fig-19

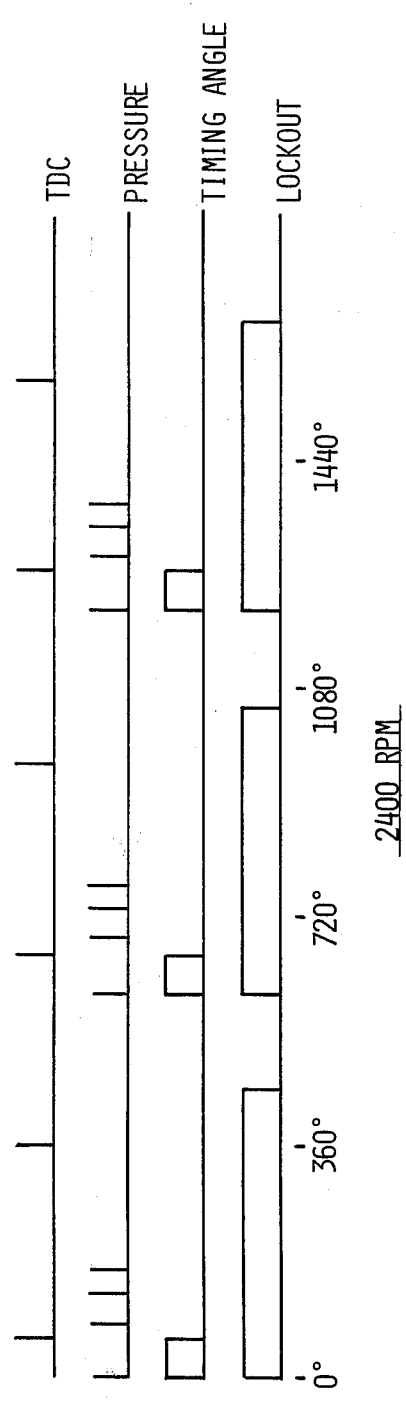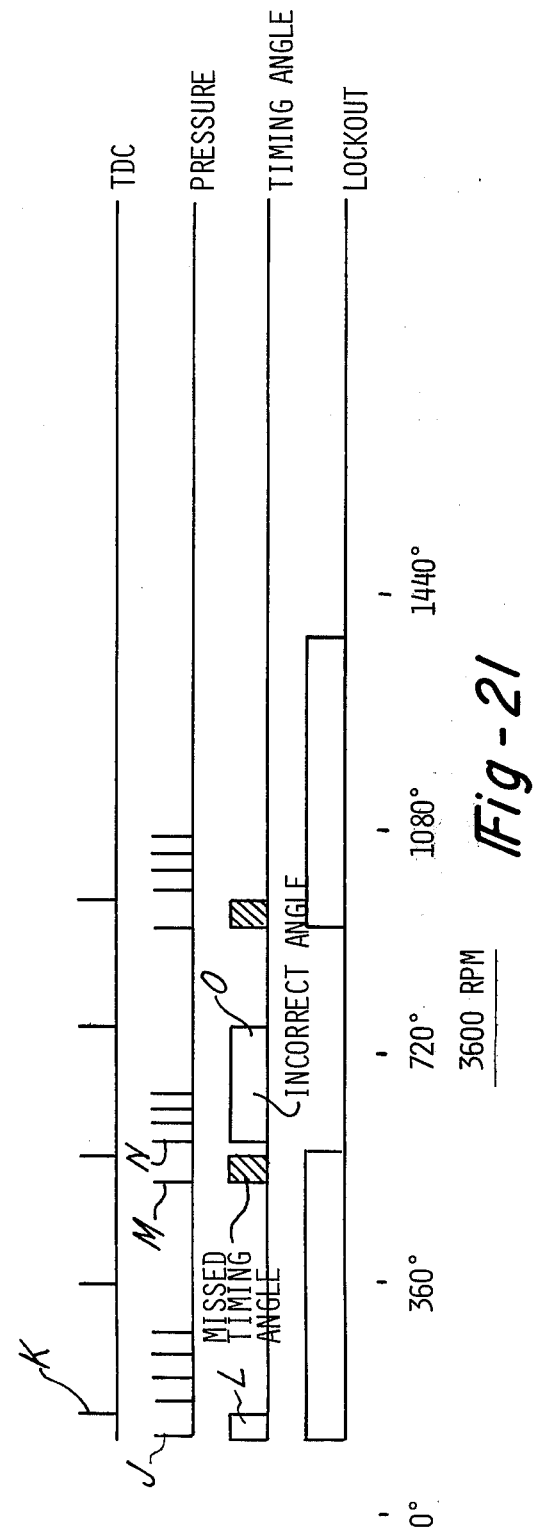

METHOD AND APPARATUS FOR TIMING DIESEL ENGINES

This invention relates to the testing of diesel engines and more particularly to an improved means for testing and adjusting the timing angle of the diesel engine. In contrast to the spark fired gasoline internal combustion engine, where there has been a need for sophisticated timing of the engine for some time, due to the necessity to produce the engines in high volume, and to control the emissions thereof, in the diesel engine field until the present time, due to the relatively low volume of diesel engine production compared with the gasoline engine production, there has not been a need to develop a fast and efficient and reliable means of testing the diesel engine on a production basis, and indeed, no fast way of performing this operation is available today. Because of the low production rates, it was easy to allow considerably lengths of time, say one half hour, for the timing operation, and this provided no incentive for developing any new methods.

Whereas, in the spark ignited internal combustion engine, the timing angle can be defined as the angle the crankshaft rotates through from the moment of spark firing in a selected cylinder, to the moment the piston in the selected cylinder reaches the top dead center position, the corresponding definition in a diesel engine is not so easily available. It is known that ignition of the mixture injected into the diesel engine cylinder occurs almost spontaneously with such injection, and that this can correspond to the spark in the spark ignited engine. However, the problem has been that there has been no precise way of determining exactly when the injection of the fuel into the cylinder occurs.

At present, for a diesel engine to be timed properly, a large number of mechanical relationships have to occur at precisely the proper time to make sure that the diesel fuel completes the path from the injection pump, through the fuel line, and through the injector into the cylinder at precisely the right time, so that the ignition of the diesel fuel will occur at the proper time to develop maximum power from the fuel injected into the cylinder. At the present time, timing of a diesel engine essentially takes the form of determining when diesel fuel will pass through the injector in relation to the top dead center of the No. 1 piston. Because the fuel injector will allow the fuel to pass into the cylinder when a certain pressure is built up in the fuel line coming to the injector, such as 2,750 pounds per square inch, the diesel engine is essentially timed by rotating the crankshaft of the engine and noting when the pressure in the fuel line leading to the injector reaches this value. A typical timing method is as disclosed in the "Service Manual" 1140–1145–1150 1160 engines, published by the Caterpillar Tractor Company. The timing procedure generally starts with setting the No. 1 piston on the compression stroke at top dead center. Usually some means is provided on the diesel engine to fix the crankshaft in this position. The No. 1 fuel line is disconnected from the injection pump and an inclined tube assembly, to take the place of the fuel line, is connected in its place. Since the engine is not running at this point, the fuel line is disconnected and a pressure tank is connected to pressurize the fuel system. The engine crankshaft is now rotated until the fuel flow from the tube assembly reaches a predetermined level. The predetermined level of fuel flow from the tube assembly will vary from engine to engine, but when it reaches its predetermined level, in this instance from 6–12 drops per minute, it is indicative of the pressure needed to operate the fuel injector. At this point, the timing pointer is read, and the reading compared to the timing angle specified by the manufacturer. If the timing is proper, the engine is re-assembled and is ready for use. If the timing is improper, the engine must be timed. As mentioned above, the timing of the diesel engine is done by insuring that fuel from the injector pump reaches the injector at the proper time. Since the injector pump is run by the camshaft of the diesel engine, this essentially involves rotating the injector pump so that the strokes of the pistons in the individual injector pumps will start their strokes either slightly sooner or slightly later than they were, to insure that the fuel reaches the engine at the proper time. In as much as the procedure for timing the injector pump to the camshaft will vary from engine to engine, the exact method is not detailed herein but a representative method is also described in the pamphlet by the Caterpillar Tractor Company mentioned above.

It is obvious that the procedure just described is a very lengthly one, and while suitable for the days when diesel engines were produced in relatively small numbers, it is unaccepatable today for a number of reasons. First, it is a process which must be performed when the engine is not running and, therefore, all the effects on the engine tolerance which the warming up of the engine may have are completely eliminated from consideration in timing the engine, therefore, affecting the accuracy of the results.

Secondly, to perform such complicated operations on the diesel engine, a great number of specialized tools are needed which means that it is a process which must of necessity be done by skilled mechanics, and which cannot be done by the average person or by the diesel engine owners who desire to perform their own maintenance.

Thirdly, with the increasing popularity of diesel engines, a process which takes such a length of time and is so inaccurate is totally unsuitable for modern production lines. Due to its lengthly nature and its unadaptability to automation, it, therefore, represents a serious obstacle to increasing production of diesel engines, which are sorely needed to combat increasing pollutant levels, in the atmosphere.

Lastly, due to the timing procedure itself, even the most careful timing operation on the engine can leave one with a very unsatisfactory timing angle due to the effects of tolerance stackup, and the like.

Obviously, the above mentioned problems could not go unsolved for long, and long being active in the field of timing spark ignited internal combusiton engines, as evidenced by the U.S. Pat. No. 3,697,865, of which I was the co-inventor, I decided to attempt to find a fast, reliable method of timing a diesel engine which was adapatable to production line methods.

Therefore, one of the objects of the present invention is to provide an improved method of testing a diesel engine which may be performed when the engine is running under its own power.

Another object of the present invention is to provide a method of timing a diesel engine in which the necessity for a substantial dis-assembly of said engine is eliminated.

A further object of the present invention is to provide a timing system which is for diesel engines more accurate than past systems, due to the elimination of the necessity of holding the crankshaft of the diesel engine in a fixed position, pressurizing the fuel system of said engine, and determining when a certain pressure is reached in the fuel line, all of which steps are manually done and provide a possibility for error.

A still further object of the present invention is to provide a compact diesel engine timing system which can easily be used by any mechanic, and which does not require the skill of a trained technician to operated either on the production line, or in the field.

A still further object of the present invention is to provide a method of determining the timing angle of a diesel engine which may be easily automated and performed in a test stand on a production line basis, and to provide these test stands around an automated conveyor to aid in such testing.

Another object of the present invention is to provide an improved diesel engine timing stand adapted to receive the test engine, to set said engine in place, to run such engine to reveal its timing angle, and to automatically release the injection pump fixing means, to adjust the injection pump, to produce a predetermined angle and thereupon to tighten the injection pump fastening means.

A still further object of the present invention is the providing of a test stand of the above nature, which will show quickly and easily by means of indicator lights whether the diesel engine timing is high, low, or acceptable.

A still further object of the present invention is to provide an improved diesel engine timing system of the foregoing nature, including a pressure transducer adapted to indicate when the fuel has been released into the selected cylinder of the diesel engine, means continuously producing pulses at uniform intervals, means to produce an impulse at the moment the fuel is released into the cylinder, means producing an impulse at the moment the piston in the selected cylinder reaches its top dead center position, and means to count the number of pulses that occur from the moment said fuel was released into said cylinder to the moment the piston of sid selected cylinder reaches its top dead center position.

A still further object of the present invention is to provide an improved engine test stand of the nature specified in the preceding paragraphs, and adapted to produce a readable signal of the timing angle which is related to the number of pulses which occurred from the moment of the occurrance of the release of fuel into the cylinder to the moment the resepective piston reached its top dead center position.

Further objects and advantages of this invention will be apparent from the following description and appended claims, reference being had to the accompanying drawings forming a part of the specification, wherein like reference numerals designate corresponding parts in the several views.

FIG. 5 is a plan view showing an automated testing system for timing diesel engines including a plurality of test stands interconnected by a conveyor adapted to deliver test engines to each test stand, to receive the tested engine from the respective stands after the test, and to deliver them to the unloading station.

FIG. 6 is a diagrammatic view showing the instrumentation and components necessary for timing one engine, such as that which may be set up in a single test stand, which may be the same as that shown in FIG. 4.

FIG. 16 is a schematic view of the control unit shown in FIGS. 7, 8 and 9 which may be used in applications where it is contemplated that secondary pressure wave signals will continue for over 360° of crankshaft revolution, and involves the use of an extremely long angular lockout period.

FIG. 17 is a schematic view of the averaging unit used in FIGS. 7, 8 and 9, which is used when it is desired to average the individual timing angles for a large number of rotations of th diesel engine to obtain a more stable result.

FIG. 18 is a graph showing the relationship between the top dead center, pressure, and timing angle signals from a diesel engine as related to a fixed time lockout signal, and showing how the system, even if started out of phase, will back up and pick up the right pressure signal, and thereafter measure the correct timing angle.

FIG. 19 shows the relationship between the top dead center signal, the primary pressure signal, and the timing angle signal, and shows what would occur if an incorrect lockout time were chosen for any particular speed of the engine.

FIG. 20 shows a graph similar to FIG. 18 with the engine operating at 2,400 RPM, and the system being in phase.

FIG. 21 shows the problems which arise if the same lockout time used in FIG. 20 at 2,400 RPM is used at the new RPM of 3,600.

It is to be understood that the invention is not limited in its application to the details of construction and arrangement of parts illustrated in the accompanying drawings since the invention is capable of other embodiments and of being practiced or carried out in various ways within the scope of the claims. Also, it is to be understood that the phraseology and terminology employed herein is for the purpose of description and not of limitation.

I began my search for an improved way to test diesel engines by trying to find something that would give as positive a signal as possible which would indicate the fuel being released into the cylinder of the diesel engine. In the course of working on this problem, it was found that there was some work being done along the line of monitoring the pressure in the fuel line of the diesel engine, either at the injector pump outlet, or at the injector itself, with some of such work being published in an article entitled, "An Electronic Analyzer for Diesel Engines" by Dr. R. Germann et al., of Graz, Austria, in which it has been found that if a transducer is placed in the fuel at the injector, a definite and repeatable plot of line pressure versus crank angle can be obtained.

Figure 10:
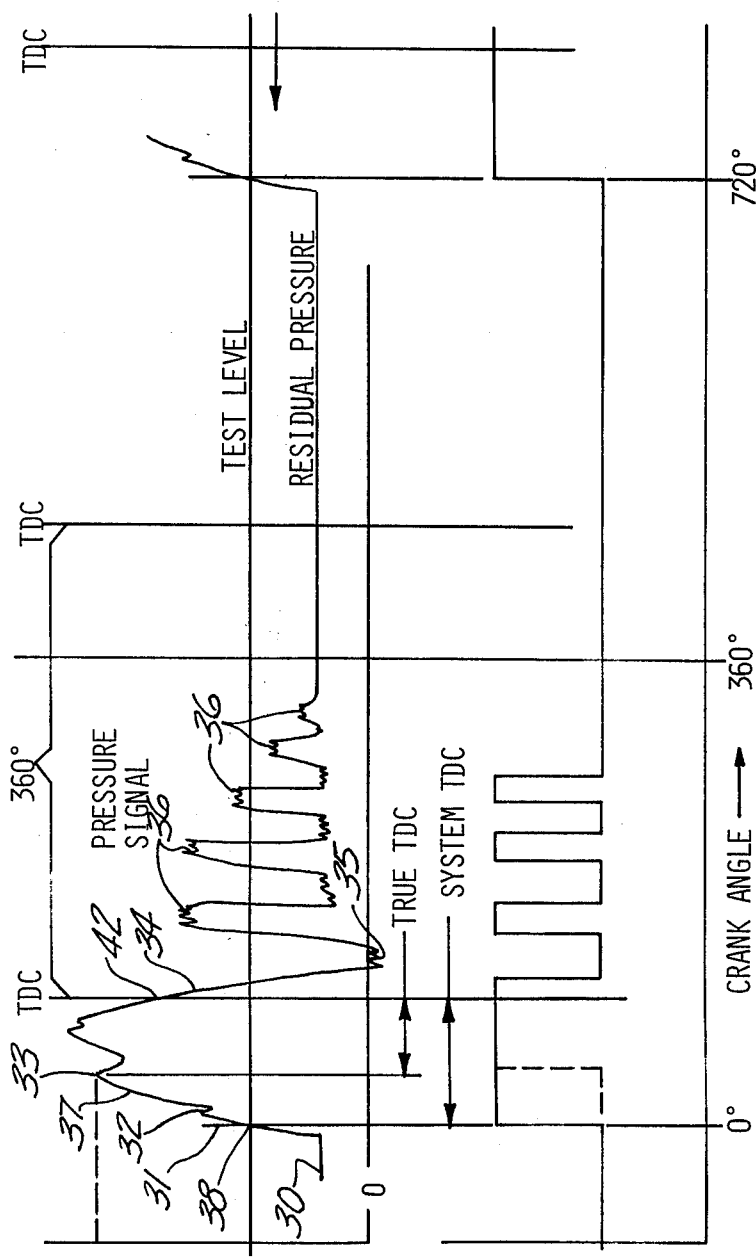
FIG. 10 shows two graphs, the upper graph showing the variation in pressure in an injector line in relation to degrees of rotation of the crankshaft for a typical diesel engine, and the lower graph showing the graph in the upper part of FIG. 10 as it is used within the system.

Referring to the top portion of FIG. 10, a typical pressure versus crank angle plot is shown. The initial portion of this graph, indicated by the numeral 30, is normally above the zero pressure, which indicates some residual pressure in the fuel line. As the crank continues to turn, the injection pump plunger related to the number one cylinder starts developing pressure in the injector line by virtue of the upward stroke of the pump plunger. This is indicated by the numeral 31.

The small delay in the pressure rise, which occurs slightly later than the initial pressure rise, and is indicated by the numeral 32, is the point at which the delivery valve of the diesel engine lifts, fills the delivery valve spring cavity and releases fuel into the fuel line. Shortly past this point, the first peak occurs at the numeral 33, which indicates the opening of the injector needle and the release of the fuel into the cylinder, which corresponds with the spark ignition of the gasoline engine.

To complete the explanation of the curve, after the fuel is released into the cylinder, the pressure will rapidly drop off as indicated by the numeral 34. During the portion of the curve labeled 34, the fuel delivery from the injector pump is cut off and the injector needle starts to close. Because the fuel is moving away from the injector nozzle at a high velocity, a momentary vacuum occurs in the line at the point labeled 35, with the other oscillations in the curve indicated by the numeral 36, which is due to oscillation in the fuel lines because of reflection of the pressure waves within the line due to the closing of the nozzle and the delivery valve.

This curve can also be represented in the TTL (transistor-transistor logic) logic as shown in the lower portion of FIG. 10, which will be discussed later. It was the property of the pressure versus crank angle curve from which I decided a workable production method of testing diesel engines could be developed.

Using the graph shown in the upper portion of FIG. 10, the solution to the problem of how to time diesel engines appears at first glance to be quite easy. By provided an encoder connected to the crankshaft of the engine which produced a fixed number of pulses per degree, and providing means to count these pulses, which would begin when the pressure at point 33 on the graph was reached, and which would stop the top dead center signal from the notch in the crankshaft was supplied, one could quite readily obtain the timing angle in the engine. However, several serious problems immediately developed. First of all, the pressure value indicated at point 33 of the curve is not a repeatable value, changing value somewhat at a fixed engine speed and greatly changing at different engine speeds. This immediately necessitated two changes in the proposed system for timing diesel engines. First, the pressure could not be read at the true top dead center but had to be read at some other point before the top dead center which would have a known and constant relationship to the true top dead center, and secondly, that point had to be at a line pressure value which could be obtained at all conditions at which it was desired to test a diesel engine.

Since the portion of the curve beginnings at the residual pressure labeled point 30 and continuing to the point 33 at true top dead center is a repeatable phenomena, and can be predicted for different speeds of the engine, it was first thought that any point on this curve could be used and that a constant repeatable result of a timing angle, which would be equal to the true timing angle plus a fixed quantity, would result. At first a point on the curve such as that labeled 37 was chosen so that one would not have to worry about the oscillations in the pressure signal due to the secondary pressure waves 36. However, it was found that this pressure was still too high for many test points of the diesel engine, and after much experimentation the point labeled 38 was arrived at which is at a pressure which can be obtained at all feasible test points of the diesel engine.

The system timing angle in this case will be the degrees of crankshaft rotation from the point 38 to the occurrance of the top dead center signal at point 42. In order to have a testing system based on a pressure signal occurring at point 38, it is necessary to have in the system means which will pick up the primary pressure signal 38 and lock out all the secondary pressure signals 36, and it is in the method and apparatus for performing this operation that a large part of the present invention resides. As at least, partly described in the publication previously mentioned, you want a lockout period long enough to encompass the pressure waves but shorter than the time between the primary pressure signals.

It can be seen at this point that just as in the four cycle automobile engine in which the spark plug will fire once during two revolutions of the engine, in the diesel engine the fuel will be released into the cylinder once during every two revolutions and it can be seen by the graph of FIG. 10, that in most instances, all the pressure signals, both primary and secondary, will dissipate by the time one revolution of the engine has occurred. Thus, depending on the speed of the engine at which you are testing, a time somewhat shorter than the time for one revolution of the engine has proved satisfactory for the lockout period.

For a speed of 2,400 RPM a lockout time of 37.5 milliseconds has proved satisfactory, and will enable you to lock on the proper signal regardless of where you start.

To illustrate how for a constant speed system a proper lockout time will enable you to back track and get the right signal regardless of where you start, the graphs of the top dead center and pressure signals as they would appear after they have been through signal conditioners can be shown by the graph labeled 18.

The graphs to be explained below are drawn in a form which represents the output of the various signal conditioners used in the circuit to be described to convert the pressure, encoder and top dead center signals to ones compatable with the system. These signal outputs are all in TTL (transistor-transistor logic) logic which, in effect, gives, for all inputs above a certain level, an output of 5 volts d.c., and for all inputs below a certain level, an output of 0 volts.

Thus, for example, you would get no pressure signal until your chosen pressure was reached, and then you would get a 5 volt d.c. signal at that time. Also, any other pressure above the chosen one would give a similar 5 volt signal.

Referring again to FIG. 18, assuming that the system would begin measuring the angle incorrectly from the third pressure wave signal after the primary pressure signal, and would not look at another pressure signal until the lockout time of 37.5 milliseconds has occurred, as shown in the graph of lockout time, the timing angle measured would show up as the time interval from the point A on the pressure graph to the next top dead center signal and would appear as the angle between the pressure signal and the top dead center signal shown by the plot of the angle represented by the letter G. This angle will obviously be the incorrect one and the system, therefore, has not yet stabilized.

The next pressure signal occurring after the lockout period is represented by the letter B on the graph showing the plot of the pressures, and the system will now pick up the pressure wave signal, and lockout other pressure signals for the time of 37.5 milliseconds, and will measure the angle occurring betweeen the point B and the next top dead center signal showing the timing angle represented by the letter H on the graph. This angle, being even larger than the previously measured angle, is incorrect and the system is still not in a stable condition. Thus, the system will continue attempting to measure the correct angle, and after the second lockout time of 37.5 milliseconds, will pick up the next occurring pressure wave signal occurring at the point labeled C. It will then lock out all other pressure signals for 37.5 milliseconds, and will measure the angle from point C to the next occurring top dead center pulse. This as it turns out, is the correct timing angle, and by virtue of the fact that the lockout time is long enough to extend for the duration of all the secondary pressure wave signals, but shorter than the time between two primary pressure wave signals, all of the erroneous pressure wave signals will be locked out, and the system agains cannot pick up a pressure wave signal until the next primary pressure wave signal located at the point labeled D on the graph of pressure signals. Again, the lockout will occur, the system will measure the angle from the point D until the next top dead center signal, which again is the correct timing angle, with the locking out again preventing reading of any but the next primary pressure wave signal. In this manner, assuming a constant speed, the system is locked into the proper pressure wave signal in as little as 2-3 revolutions of the engine, and then is ready to continue measuring as long as the speed is kept constant. The time of the lockout signal should be greater than the duration of all the secondary pressure wave signals, but shorter than the duration between the first primary pressure wave signal and the next primary pressure wave signal.

FIG. 19 shows the importance of picking the correct lockout period so a "locking in" on the proper timing angle will occur. As shown in FIG. 19, if an excessively short lockout time is chosen, one will get one erroneous value for timing angle for every correct one, with no locking in ever occurring. Erroneous readings will also occur if the lockout time is too long.

This method, for which Applicant discloses apparatus later in the application, is satisfactory as long as the testing takes place at a single fixed RPM, but immediately runs into trouble as soon as the RPM is changed in any significant degree, as it would be if tests would be run repetitively on diesel engines at a number of testing points.

Moving on to FIG. 20, the system with a fixed lockout time is shown after it has stabilized for an engine running at 2,400 RPM. However, FIG. 21 shows what would happen if the RPM of the engine were increased to 3,600 RPM, and the lockout time remained the same. Assuming still that the system is locked on the proper primary pressure signals, the system will first start measuring a timing angle at point J as shown on the pressure graph, and will measure the proper signal as the duration between the point J and the first succeeding top dead center signal, indicated by the letter K, with the timing angle indicated by the letter L.

However, since in this case the lockout period remains the same 37.5 milliseconds, but the engine speed is faster, the next primary pressure signal, indicated by the letter M, will be locked out, and the system will completely miss the measuring of the correct timing angle and will start measuring when the pressure wave signal N is received, and measure the timing angle as represented by the letter O, which is an incorrect angle.

Obviously, then, the system of having a fixed lockout time does not work when tests must be performed at different RPM's. While an obvious question would be why can't a proper lockout time be calculated for each engine RPM, and circuitry be provided to automatically select the lockout time for each different RPM, the answer to such a question would be that such a system would be prohibitively costly, very complicated, and time-consuming as you would have to wait for each circuit to stablize at each RPM before testing could begin. Such conditions, which greatly affect the accuracy and reliability of angle timing instruments simply are not permissable where production systems are required, and accuracy must still be maintained for accurate control of emissions and the like.

Thus, the method of using a fixed lockout time of short duration is unsuitable for all timing except that done on diesel engines which are to be run at constant speed, and while I have invented and claimed apparatus for use on such engines, I continued my search for a system which would work where diesel engines are intended to be run at, and, therefore, must be tested for timing at several different RPM. I determined that a period for the lockout independent of the speed of the engine had to be used. After much work, the thought of having the lockout related to angle of crankshaft revolution of the engine, rather than some time period, was arrived at.

Figure 22:
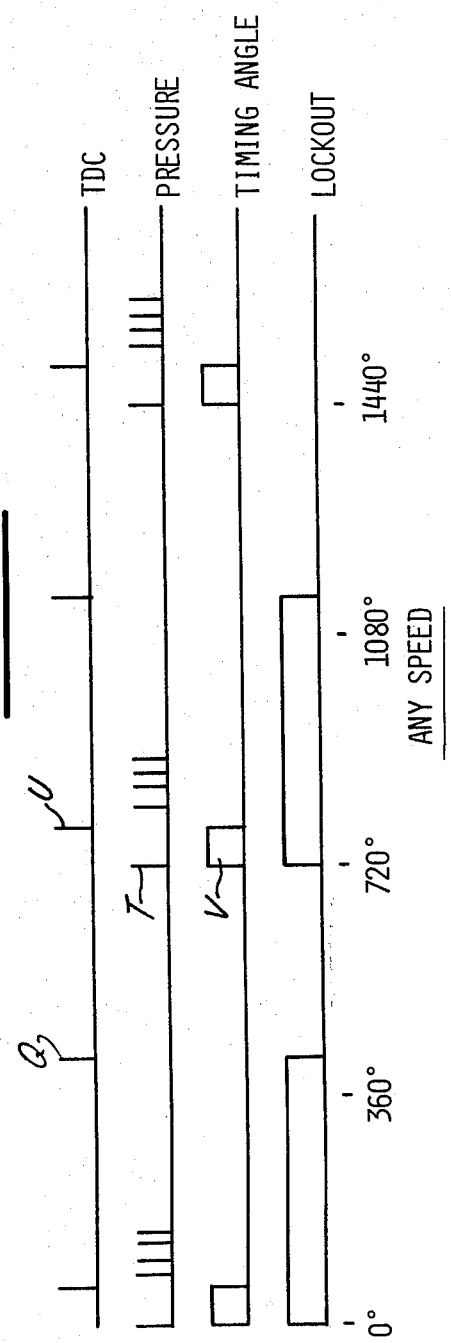
FIG. 22 shows the relationship between the top dead center, pressure, and timing angle signals in a system where the lockout period based on degrees of crankshaft rotation and the system is in phase.
Figure 23:
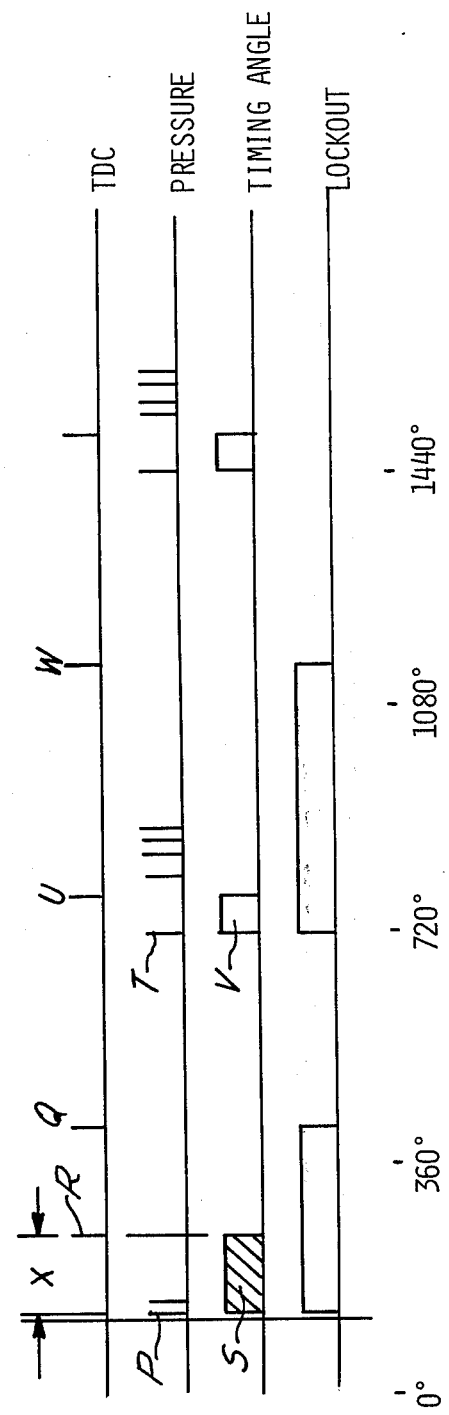
FIG. 23 shows a graph substantially similar to that shown in FIG. 22, and shows how the system based on a lockout period in degrees of rotation of the crankshaft will automatically lock into phase, if not started in phase, regardless of the RPM of the engine.

In this system, represented by the graph of FIG. 22, the same curves showing top dead center, pressure signals, timing angle, and lockout are shown, but in this system, the lockout always takes place for the angle occurring between a pressure signal and the second subsequent top dead center signal for any given engine, and thus, the lockout period is entirely independent of the speed of the engine. In this system, presuming that the system did start on the right pressure signal, it will automatically be locked in on the correct signal. However, FIG. 23, shows that even if the system starts on the wrong signal, by the simple expedient of providing a false top dead center signal after a certain number of degrees, it too will back track and stabilize on the proper primary pressure signal, but now does this regardless of the speed of the engine. Starting from the pressure signal labeled P on the pressure curve, the system will measure the timing angle from P to the first subsequent true top dead center signal Q, but in this case, since the top dead center signal Q has not occurred by the time the engine has rotated X degrees, which is an easly controllable function of the speed of the engine, a first false top dead center signal R is generated, the first timing angle then is represented by the letter S and is the angle between the pressure signal P and the first false top dead center signal R. This is obviously an incorrect timing angle.

Since the system will not look at another pressure signal until after the next occurring top dead center signal, which in this case is a true top dead center signal, represented by the letter Q, which occurs after all the secondary pressure wave signals have occurred, the next pressure signal, represented by the letter T, is a primary pressure signal, and will start the system functioning in phase. The system will measure the angle between the primary pressure wave signal T and the next true top dead center signal, represented by the letter U, and thus, find the true timing angle represented by the letter V. All the other pressure signals will be locked out until the next top dead center signal, represented by the letter W. Since the lockout signal now goes by the top dead center signals, the system will only measure the true timing angle of the engine. The advantage of this system over the system wherein individual lockout times would have to be calculated for each engine speed is the fact that the lockout angle once the system is stabilized, is always constant, and that the initial angle check X only needs to be chosen to be larger than the contemplated maximum timing angle of the engine being tested. This results in a system completely independent of engine RPM, in which numerous tests at different engine RPM can be constantly repeated using a relatively simple circuit, and in which the accuracy will always be maintained.

Figure 24:
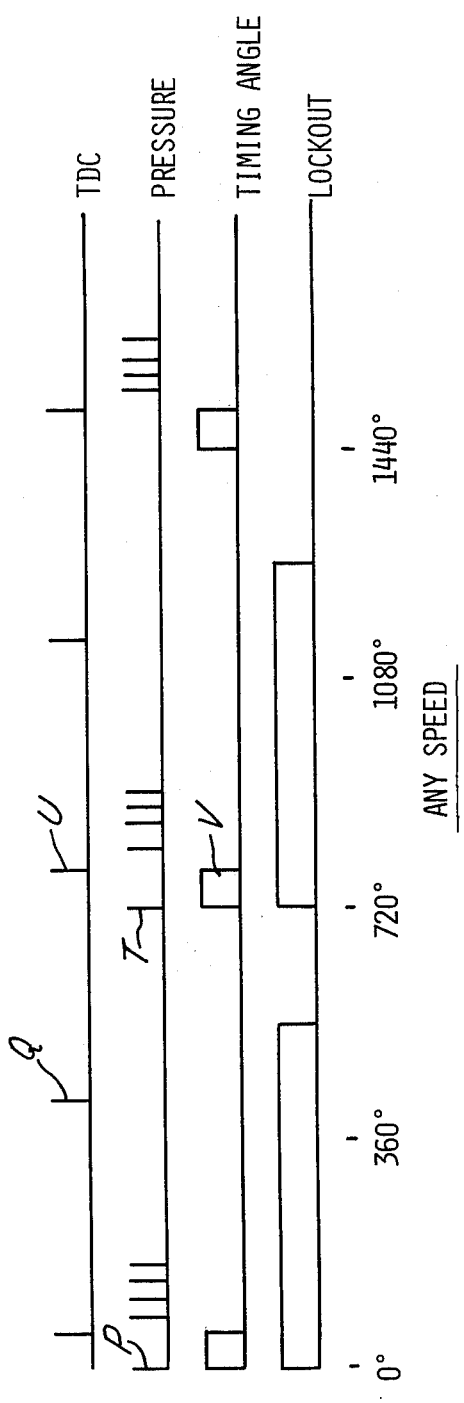
FIG. 24 shows a graph of the top dead center, pressure, timing angle, and lockout signals as they may be produced in a system using an extremely long lockout period, such as those which may be needed if the particular engine being timed is susceptible to having secondary pressure waves occur in the pressure lines beyond 360° crankshaft rotation.
Figure 25:
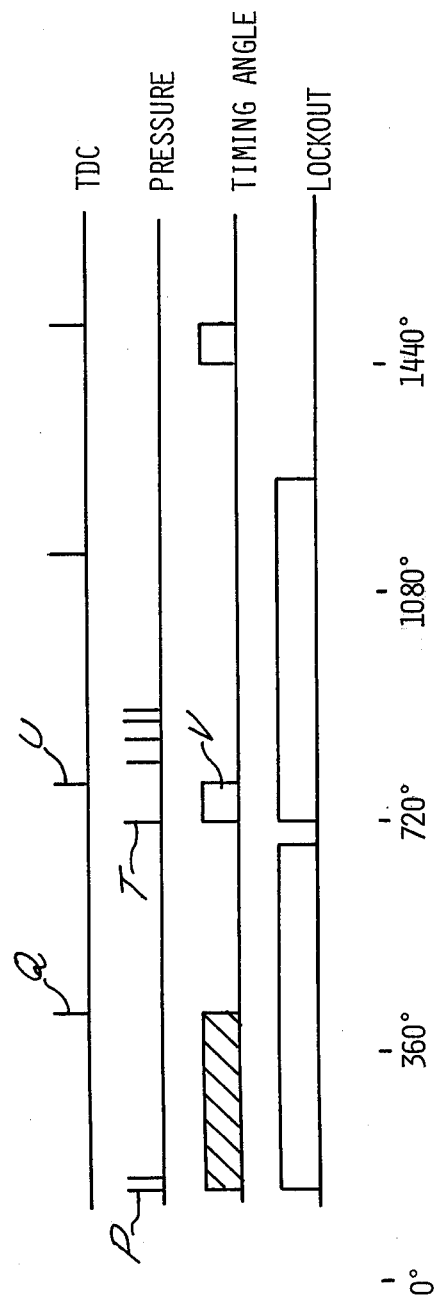
FIG. 25 shows how the system of FIG. 24 will also automatically lock into phase regardless of the RPM of the engine.

The above system will operate under virtually any conditions and speed, but Applicant does contemplate the possibility where in the secondary pressure wave signals generated after the primary pressure signal would continue past the next subsequent true top dead center signal, which would give a false reading in a system operating on the principle just described, as the pressure signal picked up after the false top dead center signal would not be the primary pressure signal T, but some other pressure wave signal. Referring to FIGS. 24 and 25, in this case, Applicant prefers to use a further lockout period which can be said to be analogous in some respects to the constant time lockout time previously described for the fixed speed system, but which again is independent of engine speed. In this case, the fixed lockout period would be of a substantial angle, such as 540°, and upon receipt of the pressure signal P, no other pressure signals would be looked at until the expiration of the lockout period. The system would measure the timing angle as occurring from the point P until the first subsequent top dead center signal Q, and obviously this value would be incorrect. However, in this system, the back tracking would occur such as described for the fixed speed system and the next pressure signal looked at would be the primary pressure signal T. The system would measure the angle from the point T to the next subsequent top dead center signal U, and would find the timing angle V. The system would now be in phase and would continue to find the correct timing angle. Thus, I have devised a system which can determine the timing angle of a diesel engine in a relatively simple, uncomplicated and inexpensive manner, and suffers from none of the disadvantages described from the old method used in the art.

Figure 7:
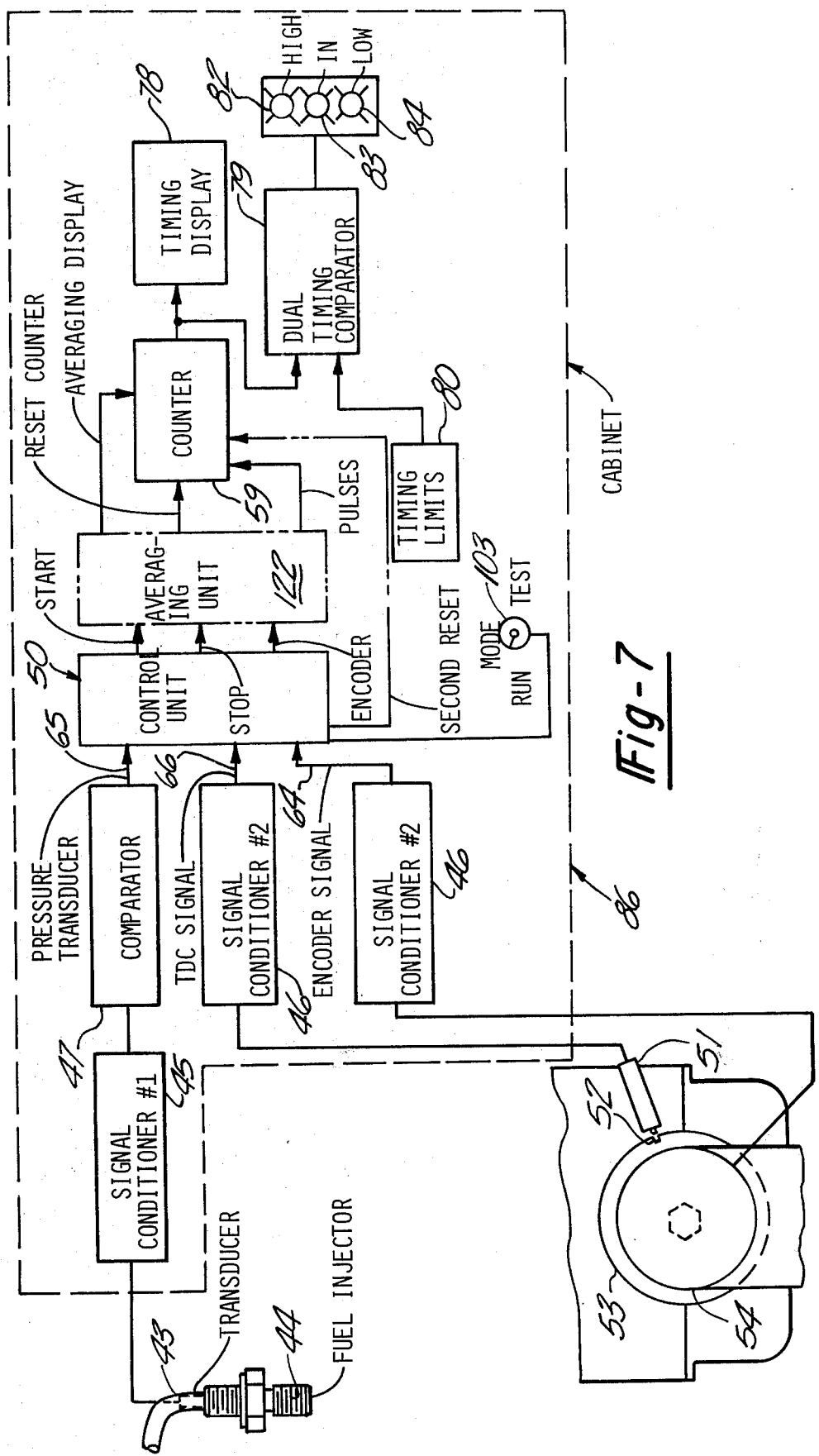
FIG. 7 is a diagrammatic view showing the necessary electronic components to determine and display the timing angle of a diesel engine.

Referring to FIG. 7, in operation, the system for determining the timing angle operates by picking up a signal from a pressure transducer 43 mounted in the fuel line running to the fuel injector 44. The signal from the pressure transducer 43, which if displayed on an oscilloscope, would be similar to the plot of the signals shown in FIG. 10, is fed into the first signal conditioner 45. This first signal conditioner, in contrast to the second signal conditioners 46, which will be discussed later is a commercially available unit which may be similar to the Model 4051 by Action Instrument Company, Inc., San Diego, California. This signal conditioner converts the signal from the transducer 43, which is a millivolt signal, into a signal compatible with the system. The voltage from the signal conditioner is in the range of from 0 to 10 volts d.c. and it is still necessary to further change the signal to one which is better used in the system. This change takes place in the comparator 47 wherein the signal from the signal conditioner 45 is changed into a voltage signal following transistor-transistor logic.

In this system, signals following transistor-transistor logic (TTL logic) are used, which, in effect, means that all signal values above a pre-selected value will be equal to 5 volts, and all signals below the pre-selected value will be 0 volts. While the TTL signals are used in the present invention, Applicant wishes it understood that other signal systems may be used in the present invention, without departing from the spirit or scope of the claims.

Figure 13:
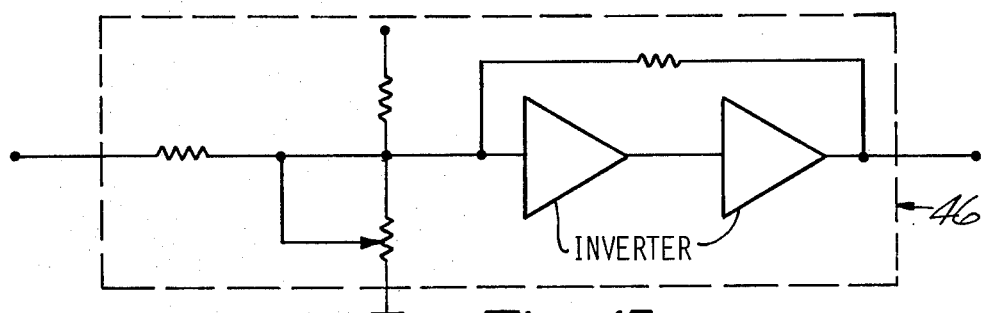
FIG. 13 is a schematic view of one of the signal conditioners used in the circuitry of the present invention.

The output of the comparator 47, which is now a TTL signal is fed into the control unit generally designated by the numeral 50. Simultaneously, with this occurrance, two other signals are being obtained which are also being supplied to the control unit. The first is a top dead center signal which is picked up in the usual way by a magnetic pick-up 51, or other device, such as a photoelectric cell 55, cooperating with a notch 52, hole or protrusion on the engine damper 53 or fly wheel. This top dead center signal is now fed into a second signal conditioner 46 where it is also converted into a TTL signal. Although such signal conditioners are well known in the art, and several types are available, and it is believed that this particular signal conditioner may also be commercially available, since a source is not readily known for it, I have designed my own signal conditioner which takes the form shown in the schematic diagram in FIG. 13. This shows a signal conditioner in the form of a Schmitt trigger, which is well known in the art, and it is believed that further explanation of the schematic diagram shown in FIG. 13 is unnecessary. The signal output of this signal conditioner 46, which represents the signal from the magnetic pick-up 51, is also in the form of a TTL signal, and is fed into the control unit 50.

The last signal that is needed for the control unit is a signal from the encoder 54, which may be encoder Model 836HOS of Disc Instruments, Inc., Costa Mesa, Calif. This signal is fed into another second signal conditioner 46, where it is also changed into a TTL logic signal.

Figure 14:
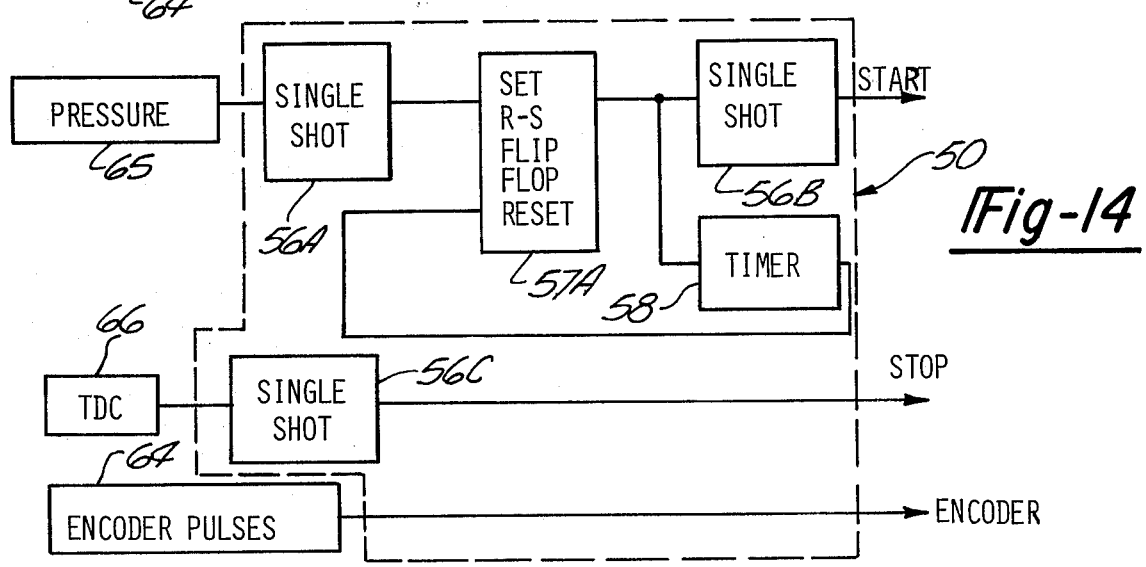
FIG. 14 is a schematic view of the control unit shown in FIGS. 7, 8 and 9 which is used when timing the diesel engine at a fixed speed.

What occurs at this stage is now dependent on the type of timing angle system which is desired. As explained earlier there are some timing applications where, diesel engines are only run a constant speed such as in turbines, etc., and in such case timing may only be done at one point of operation. For this application the control unit generally designated by the numeral 50 may contain such apparatus as shown in FIG. 14.

In the system for measuring the timing angle of the diesel engine operating at constant speed, as was previously described, a fixed time lockout was used. After the signal 65 from the pressure transducer 43 is passed through the signal conditioner 45 to convert the voltage to a signal useable in the system, which is in this case a signal following the TTL logic (transistor-transistor logic), this signal is fed into a single shot monostable multi-vibrator 56A, which results in a short duration voltage pulse being fed into the R-S flip flop 57A, and it sets the flip flop. This results in a high output from the flip flop 57A, being fed both to a single shot monostable multivibrator 56B, and a timer 58. Simultaneously with the output of the single shot 56B enabling the counter 59 to begin counting pulses 64 from the encoder 54, the output from the flip flop 57A will also begin a timer. The timer will now begin to time the desired lockout period. In the meanwhile, the top dead center signal from the signal conditioner 46 will stop the counter 59 from counting any further pulses. After this occurs, nothing will happen until the timer completes the count of the desired time interval after which it will re-set the flip flop, allowing the cycle to begin over again.

Figure 15:
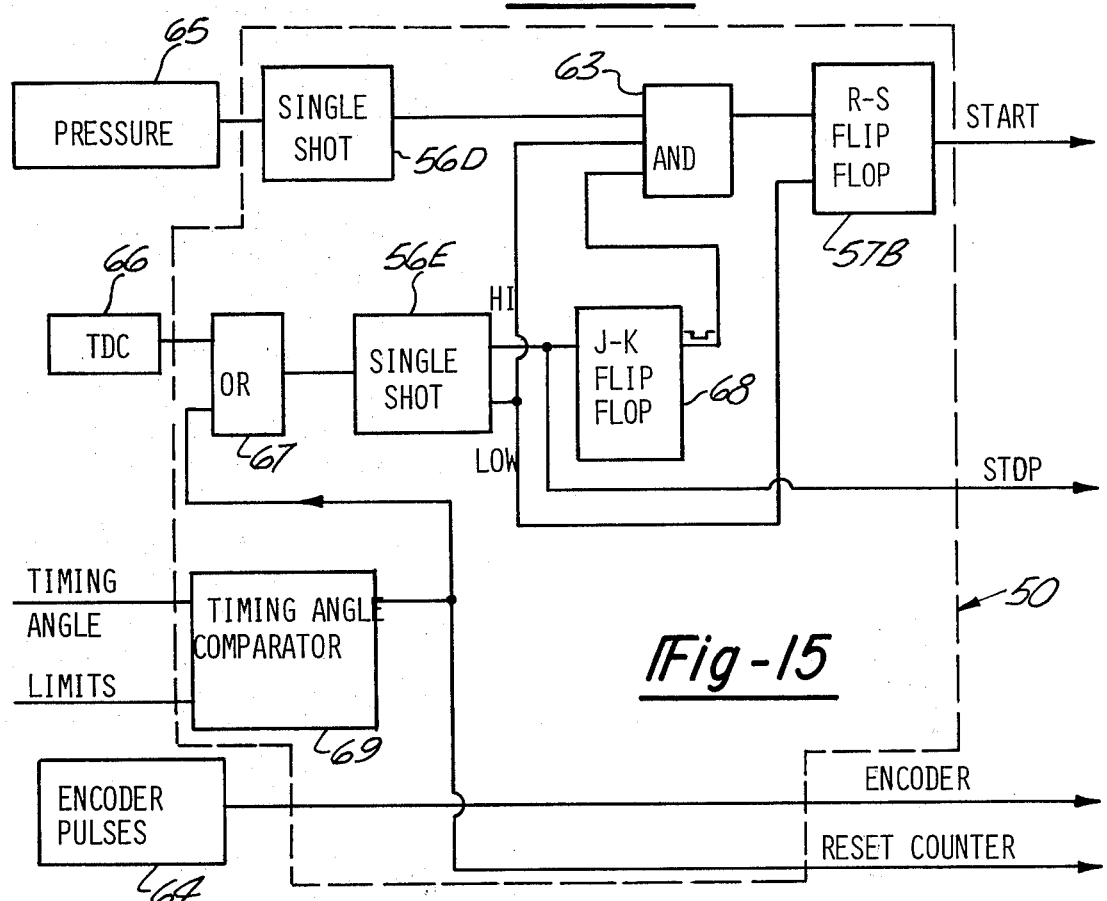
FIG. 15 is a schematic view of the control unit as shown in FIGS. 7, 8 and 9 which may be used when it is desired to test a diesel engine rapidly and repetitively at a number of different RPM's, and is adapted to provide a lockout period in terms of degrees of crankshaft rotation rather than the fixed lockout period provided by the control unit of FIG. 14.

However, as previously discussed, in many, many diesel engine applications, such as in motor vehicles, off-road vehicles, etc., diesel engines are intended to run at many different speeds, and, therefore, to assure proper operation at such speeds, they must be timed at many different RPM, and the problems previously described in timing diesel engines at different operational speeds will occur. In this situation, a system using a fixed lockout period in terms of an angle has proven particularly advantageous. In this system the control unit may contain apparatus such as shown in FIG. 15.

In the system where the diesel engine is to be tested at various speeds, the circuit becomes somewhat more complicated. In this instance, when a pressure signal 65 is received, it is immediately fed into the single shot monostable multi-vibrator 56D, such as the Model DM 74121 manufactured by the National Semi-Conductor Corporation of Santa Clara, Calif. This immediately causes a high output to be fed into the AND gate 63, which can be one such as the Model DM 7411, also manufactured by the National Semi-Conductor Corporation of Santa Clara, Calif.

The output of the AND gate is now fed into the R—S flip flop 57B, which provides a start signal to the counter to begin counting pulses 64 from the encoder 54. After the furnishing of the start signal, the top dead center signal 66, which has also been conditioned by the signal conditioner 46, is fed through the OR gate 67 into another single shot monostable multi-vibrator 56E, which can be identical to the one just described. The OR gate 67, may be such as Model No. 7432 manufactured by the National Semi-Conductor Corporation. The high output from the single shot 56E is fed into the J—K flip flop 68 such as Model DM 7470 manufactured by the National Semi-Conductor Corporation.

This input makes the J—K flip flop 68 go to its bw state and this input is fed into the AND gate 63 which prevents secondary pressure signals 65 from getting through. The low output from the single shot 56E is the third input to the AND gate 63. The combination of these inputs prevents additional pressure signals 65 from going to the counter 59 until desired. When the time duration of the single shot 56E expires, the previously low output will become a high output and will re-set the R—S flip flop 57B in preparation for future operation.

Simultaneously with this occurrance, the output of the single shot 56E will also send a signal to the counter 59 to stop it from counting any further pulses 64 from the encoder 54. At this point we have counted the number of pulses from the encoder 54 and have completed measuring the timing angle of the diesel engine. This is assuming that the system was in phase from the beginning and that no problems were encountered by virtue of beginning the timing angle count on a signal other than the primary pressure signal. Again, presuming the system is still in phase, we are approximately in the middle of the lockout period. In accordance with the operation of this system, the lockout period will end with the occurrence of the next top dead center signal 66. The next top dead center signal will, as previously described, pass through the OR gate 67, and enter the single shot 56E, which again puts out a high and a low signal, with the high signal entering the J—K flip flop 68 and producing a high output therefrom which enters the AND gate 63, which, in turn, enables future pressure signals 65 to start timing the next cycle of the diesel engine.

If the system has started out of phase, such as previously described, because of a change in engine speed, or for any other reason, it is necessary to put the system back in phase. This is done by first checking to determine that the system is indeed out of phase, which will be affirmed if a measured timing angle exceeds the maximum expected timing angle of the engine. To check this, the system will begin by accepting the pressure signal 65 with such pressure signal entering the single shot 56D. This will cause a momentary voltage pulsation to leave the single shot 56D and enter the AND gate 63, with the signal passing through the AND gate and setting the R—S flip flop 57B which, as previously described, will enable the counter 59 to start counting pulses 64 from the encoder 54. At this stage, with the system out of phase, the timing angle represented by the pulses counted from the encoder will reach a value greater than the maximum expected timing angle of the engine, in this example, 50°.

This value is represented by a signal from the counter entering the timing angle comparator. This value which is continually changed by each pulse from the encoder is compared with the limits which have been previously entered in the timing angle comparator 69, and when this value equals the value of the limits, in this case 50°, an output signal from the comparator 69 is fed into the OR gate 67, thereby creating a false top dead center signal. In this case, the false top dead center signal will pass through the OR gate into the single shot 56E. The single shot has a high and a low output, with the low output supplied both to the AND gate 63 and the R—S flip flop 57B, and blocks additional pressure signals from passing through. When the time duration of the single shot 56 E expires, the previously low output will become a high output and will reset the R—S flip flop 57 B in preparation for future operation.

The next top dead center signal will, as previously described, pass through the OR gate 67, and enter the single shot 56 E, which again puts out a high and a low signal, with the high signal entering the J—K flip flop 68 and producing a high output therefrom, which enters the AND gate 63, which in turn enables future pressure signals 65 to start timing the next cycle of the diesel engine. At this point, then, the effect of starting at the wrong pressure wave signal has been compensated for, and the system will now be in phase with the lockout period now being as previously described, and extending from a primary pressure signal to a subsequent top dead center signal, and will start correctly measuring the timing angle of the diesel engine starting with the next pressure signal. The operation will now just be a repeat of the process just described for the system when it is in phase.

For applications where it is contemplated that the secondary pressure wave signals will continue for over 360° from the primary pressure wave signal from the transducer, I have devised a third system to take care of this situation which is also completely independent of the RPM of the engine.

In this system, as in the one just described, the lockout is based on degrees of crankshaft rotation, but in this case, due to the extremely long duration of the secondary pressure waves, the lockout angle is set at an arbitrary number of degrees, which must be greater than the duration of the pressure waves.

Referring to FIG. 16, in this case the system begins by accepting a pressure signal 65, passing it through the single shot 56F, and entering this signal in the AND gate 77, which may be such as Model DM 7408 manufactured by the National Semi-Conductor Corporation. This signal passes through the AND gate and enables the counter 59 to start counting pulses 64 from the encoder 54. Simultaneously with the first counter 59 beginning to count pulses 64 from the encoder 54, the encoder signal 64 and the pressure signal 65 are also fed into a second counter 73 and the number of pulses in the counter is immediately entered into two comparators. A first comparator 74 contains a limit equal to the lockout period. The second comparator 75 contains a limit equal to one pulse of the encoder 54. Immediately upon the second counter 75 receiving the first pulse from the encoder 54, an output signal would be supplied from the comparator to an inverter 76, which may be similar to Model DM 7404 manufactured by the National Semi-Conductor Corporation. The signal from the inverter will be supplied to the AND gate 77, which will prevent future pressure signals from passing through the AND gate, thus, allowing the first counter 59 to continue counting pulses from the encoder. When the next subsequent top dead center signal 66 occurs, it passes through the single shot 56G to the counter 59, which is shut off, and a number of pulses equal to the timing angle is displayed on the timing angle display 78. After the display of the number of pulses, since the lockout period has not yet expired, the second counter 73 continues to count pulses from the encoder 54 until the limits stored in the first comparator are reached. When the limit stored in the first comparator 74 is reached, the second counter 73 is re-set to 0, and this stops it from counting additional pulses. With this occurrance, the 0 output from the second counter 73 sets the second comparator to 0 and supplies a signal through the inverter 76 to the AND gate 77, which enables the AND gate to pass future pressure signals therethrough. At this stage, presuming the system originally started in phase, and since the lockout period is less than the angle between the first secondary pressure signal and the next primary pressure signal, the system will remain in phase and will continue to correctly measure the timing angle of the internal combustion engine regardless of the speed.

If the system started counting pulses on the first, secondary, or other secondary pressure signal, and thus, was out of phase because of change in speed of the engine, or for other reasons, the system will also back track as previously described to put the system in phase. After the counting of pulses for the erroneous angle is concluded, because of the long duration of the lockout period, all the secondary pressure wave signals will be by-passed. Upon the expiration of the lockout period, the AND gate is re-set to allow subsequent pressure signals to pass therethrough. With this occurrance, since all the secondary signals have been overlooked, the next pressure signal to pass through the AND gate must of necessity be a primary pressure signal, which will then enable the counter to begin counting the pulses from the encoder to measure the proper timing angle, accurately, all regardless of the speed of the engine.

Regardless of which lockout system is used, the outputs of the control units 50 shown in FIGS. 14-16 will consist of three signals, a start signal, a stop signal, and the encoder signal. The averaging unit (to be discussed below) converts these signals for use by the counter 59, and the timing angle would be displayed on the timing angle display.

If it is desired to indicate whether the timing angle is high, low, or in band, the counter 59, would also supply signals to the dual timing comparator 79, which, in turn, would compare the measured timing angle from the counter 59 with the pre-selected timing limits 80. The dual timing comparator 79 would then illuminate an appropriate indicator light to indicate whether the timing angle was high, low or in band. If the timing was high, the high indicator light 82 would be illuminated, if the timing was low, the low indicator light 84 would be illuminated, and if the timing angle was neither high nor low, it would be in band, and the in band light 83 would be illuminated.

Figure 1:
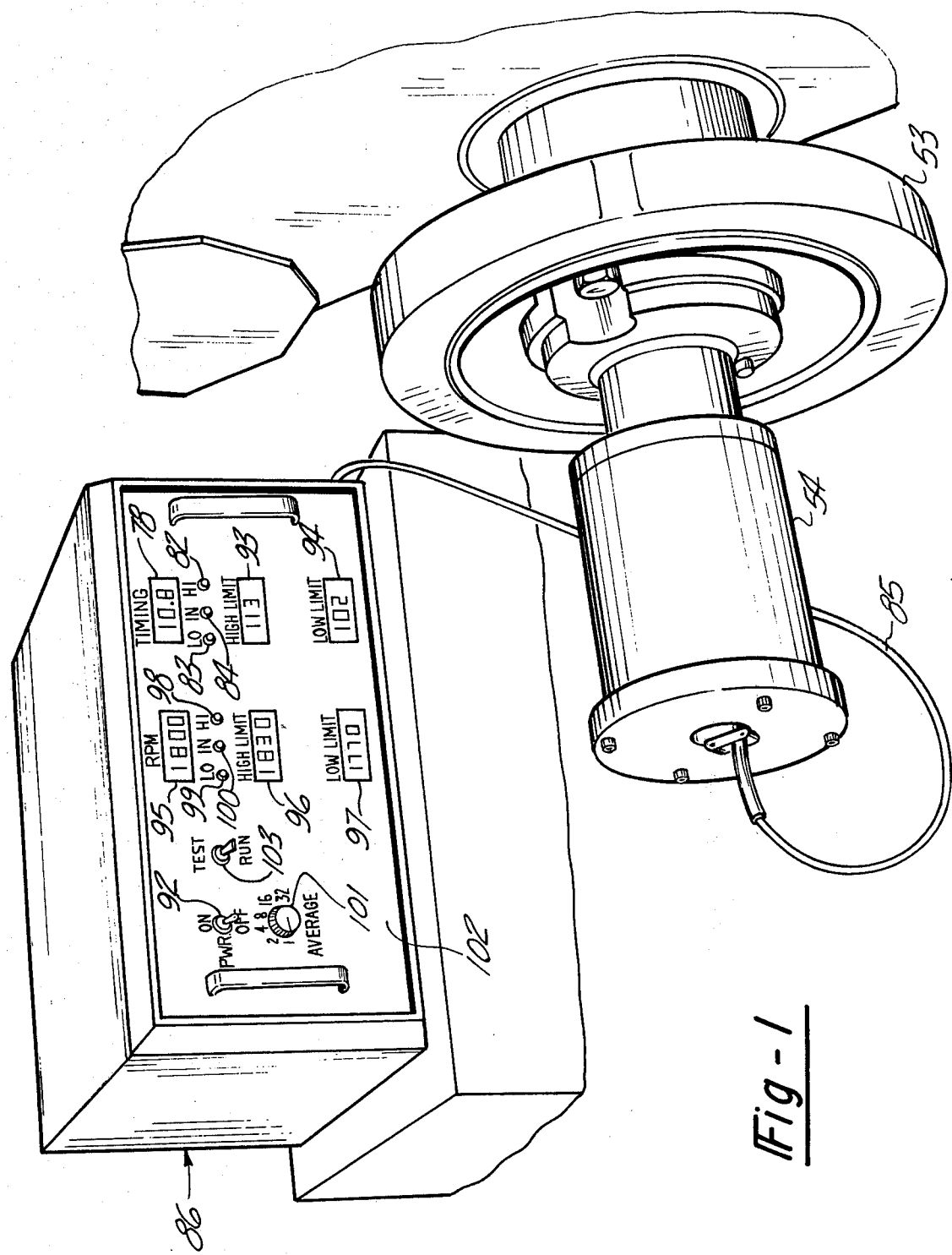
FIG. 1 is a perspective view of a construction embodying the present invention as it may be used to test a diesel engine, showing an encoder connected to the crankshaft of said engine, and being connected by virtue of an electric cable to control cabinet containing the apparatus necessary to operate the system.

There has, so far then, been described a basic system for obtaining the timing angle of a diesel engine by the use of a pressure transducer. In its finished form the system may take the appearance shown in FIG. 1, with an encoder 54 attached in an appropriate manner to the harmonic damper 53 of the diesel engine, and being connected by means of an electric cable 85 to a cabinet 86. The cabinet 86 would contain all the apparatus shown in FIGS. 7-9 except, of course, for the parts of the diesel engine being utilized for the timing operation, the magnetic pick-up, the pressure transducer, and the encoder.

Figure 2:
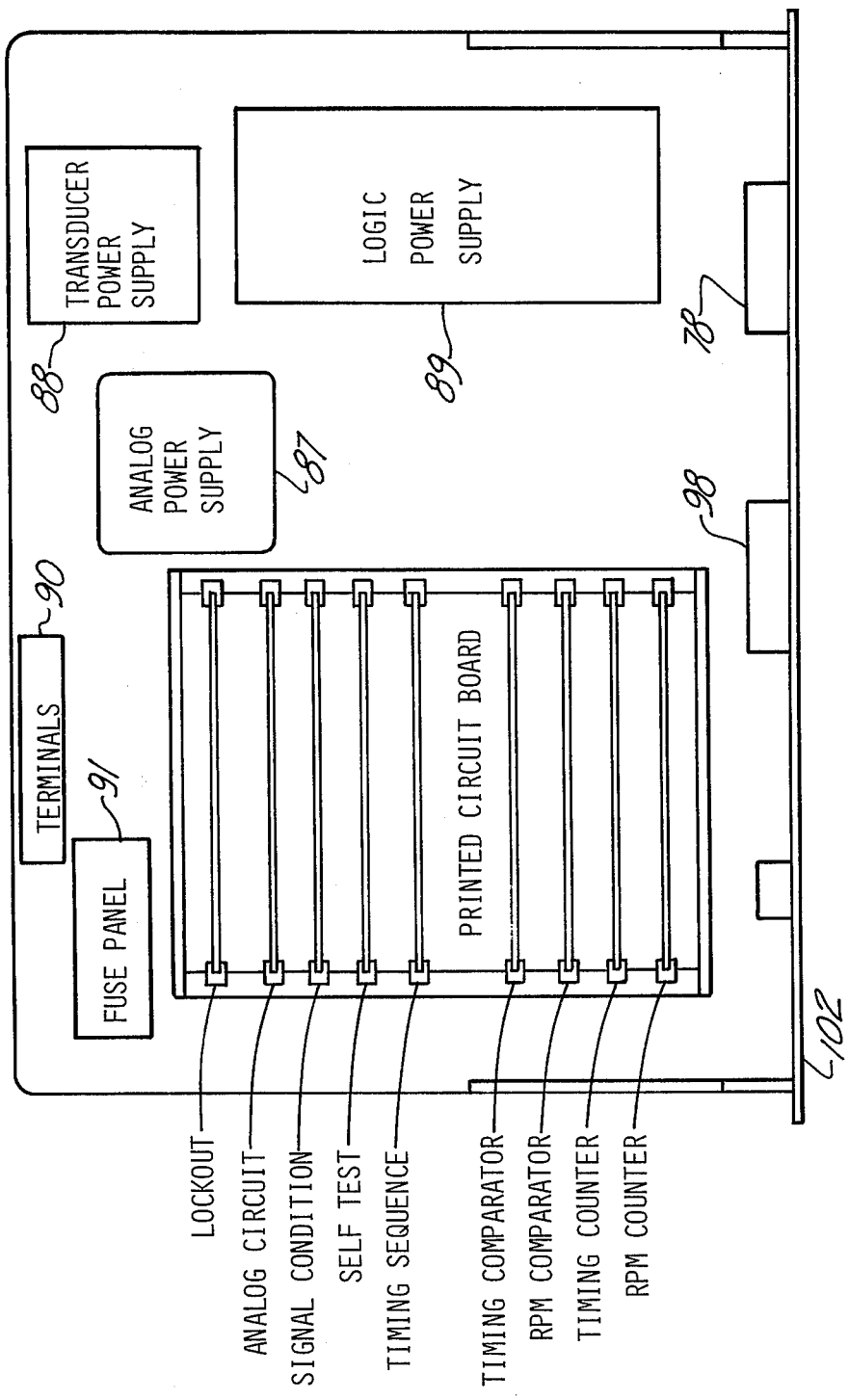
FIG. 2 is a plan view of the interior of the control cabinet of FIG. 1.

To show the contents of the cabinet 86, it is indicated in dotted lines in the various figures. Referring to FIG. 2, it is, of course, contemplated that suitable power supplies, such as the analog power supply 87, the transducer power supply 88, and the logic power supply 89 will be supplied, as well as various terminals 90 and fuses, illustrated by the fuse panel 91. Also, a suitable on-off switch 92 controls the supplying of outside power to the unit. It is also contemplated that the timing limits 80 supplied to the dual comparator may be manually selected and visually displayed by means of the high limit selector 93 and the low limit selector 94. As will now be discussed, the system can also display the RPM by means of the RPM display 95, and display the RPM limits manually set into the unit by means of the RPM high limit selector 96 and the low limit selector 97, with the RPM high, low, or in band display lights, No.'s 98-100 respectively, showing whether or not the engine is running within the RPM range specified by the manufacturer. The unit, as will be discussed in relation to FIG. 8 can be further constructed so it will not measure the timing angle unless the diesel engine is running within the RPM limits prescribed by the manufacturer for timing the engine. Also, for reasons to be discussed below, in the timing of any engine it is very desirable to take the reading from the cylinder being timed more than once, and then average the readings, to get a more stable result, therefore, a number of averages switch 101 is provided on the control panel 102, and will be discussed further in regard to FIG. 17. Also, there is provided a test-run switch 103 for choosing whether the system is to be in the test mode, during which timing an internal self-test of the unit may be performed to determine whether all systems are operating correctly, or whether it is to be in the run mode, ready to test diesel engines.

Figure 8:
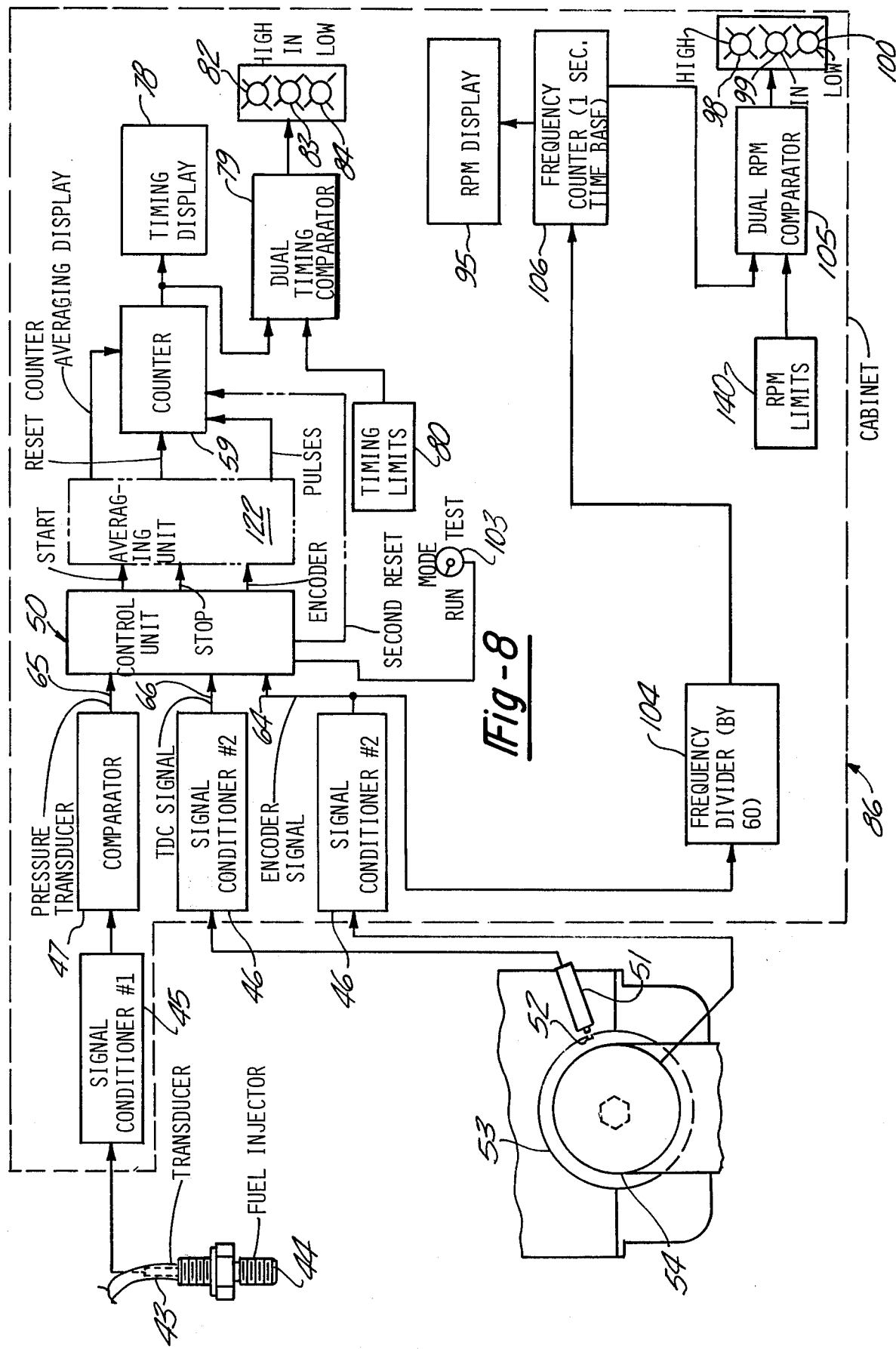
FIG. 8 is a view subatantially similar to FIG. 7, but showing the necessary additional equipment needed to calculate and display the RPM of the diesel engine, in addition to that equipment previously shown for determining and displaying the timing angle of the engine.

Now referring to FIG. 8, if it is also desired to have information concerning the RPM of the engine, the additional apparatus shown in FIG. 8, over that shown in FIG. 7, may be added to the circuit. In this situation the encoder signal from the signal conditioner 46, in addition to being supplied to the control unit 50, is also supplied to the frequency divider 104. The purpose of the frequency divider is to change the output of the second signal conditioner 46 to a value equal to the RPM of the engine. Since the encoder gives 3,600 pulses per revolution, it will give 3,600 times the RPM of the engine pulses per minute, or 60 times the RPM of the engine pulses per second. It is now desired to obtain the number of pulses equal to the RPM of the engine in one second. If the value of 60 times the RPM of the engine pulses per second is now divided by 60, the value obtained will be such that the number of pulses counted in one second will be equal to the RPM of the engine. The frequency counter 106 now counts the number of pulses supplied by the frequency divider 104 for a one second period, and then displays this value of the RPM display 95. If it is desired to know whether the RPM at which you are determining the timing angle of the diesel engine is within the limits specified by the manufacturers for performing this operation, the frequency counter 106, in addition to supplying a signal to the RPM display 95, may also supply a signal to the dual RPM comparator 105, which will now compare the RPM measured with pre-selected RPM limits 140, and light the appropriate lights 98-100 on the display panel 102.

Figure 9:
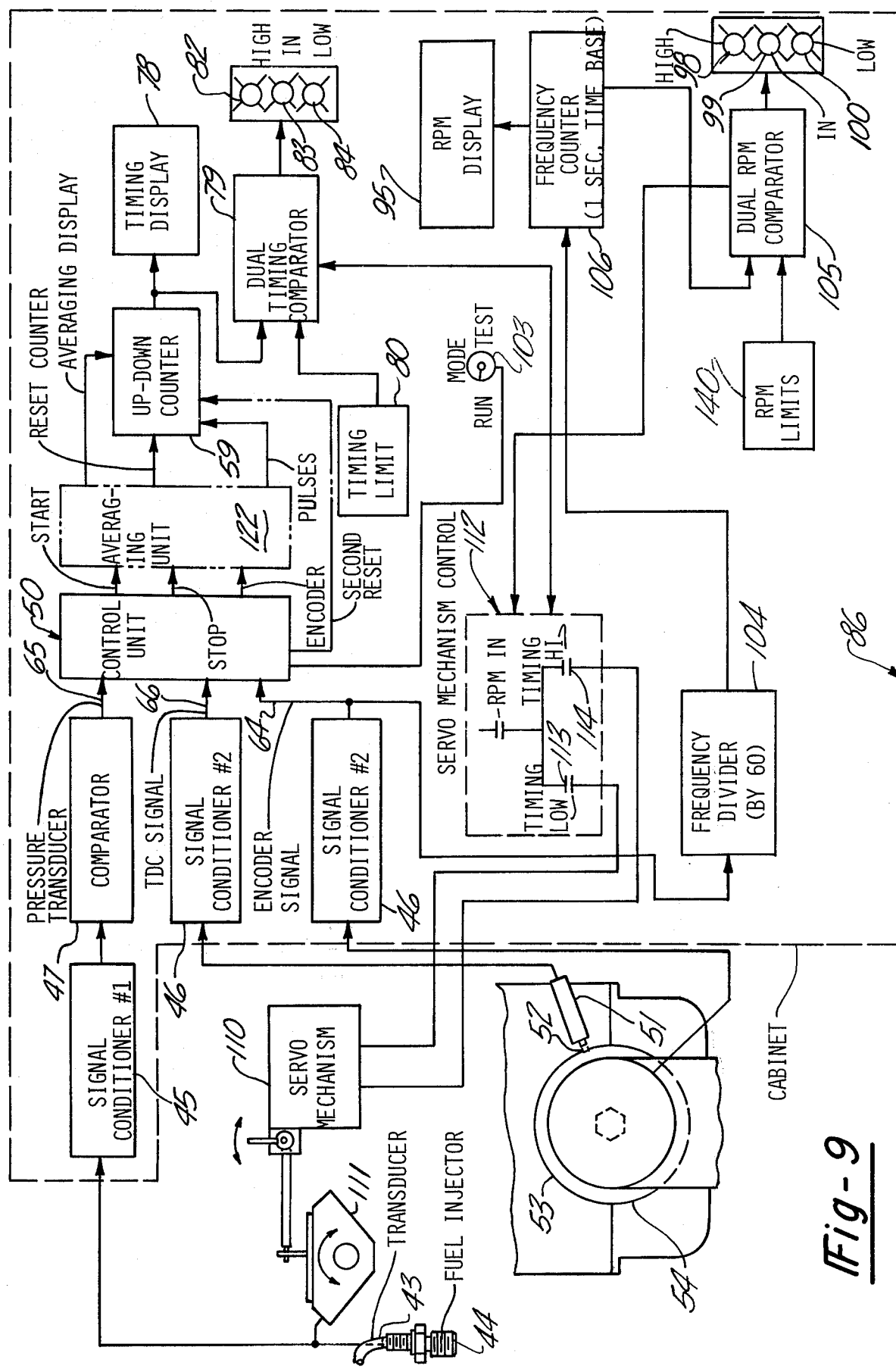
FIG. 9 is a diagrammatic view substantially similar to that of FIG. 8, but adding the equipment necessary to adjust the injection pump to set the timing angle at a desired timing angle, if the measured timing angle is outside of permissable limits.
Figure 12:
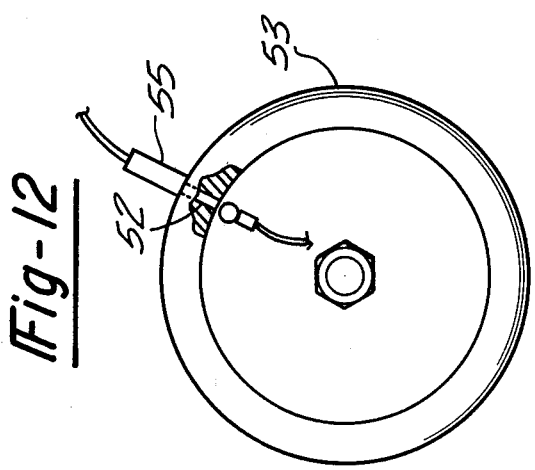
FIG. 12 is still another modification of the means for producing a top dead center signal by using a hole in the harmonic damper in combination with a photoelectric device.
Figure 11:
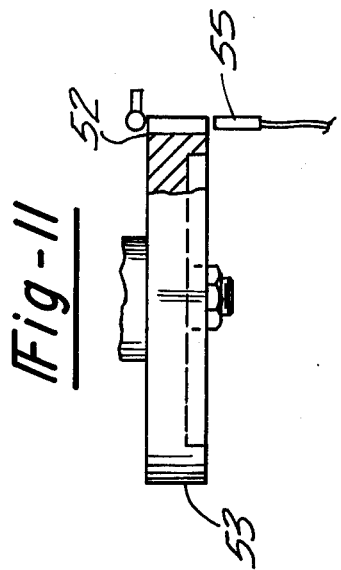
FIG. 11 is a modification of the means for producing the top dead center signal by using a slot in the harmonic damper, in combination with a photoelectric device.

If sufficient volume, or other considerations, justify the use of the additional apparatus necessary to automatically adjust the diesel engine injection pump 111, and thereby time the diesel engine, a servo-mechanism 110, and a suitable servo-mechanism control 112, can be added to the apparatus already described in FIG. 8. Such a system is shown in FIG. 9. The servo-mechanism control generally designated by the numeral 112, needs two signals in order to operate the servo-mechanism 110, which, in turn, actually adjusts the position of the injection pump 111. These take the form of a signal from the dual RPM comparator 105, and from the dual timing comparator 79. If the signal from the dual RPM comparator indicates that the speed of the engine is within limits established by the manufacturer for the timing operation, the servo-mechanism control 112 can then accept a signal from the dual timing comparator which will indicate whether the timing is high, low, or in band. If desired, the timing display 78 could be blanked out until the RPM is in band. If the signal from the dual timing comparator 70 indicates that the timing is outside the limits established by the manufacturer, one of two things will happen. If the signal indicates the timing is too low, after the injection fastening means (not shown) are loosened, the timing low relay 113 will close and the servo-mechanism 110 will turn the injection pump 111 in a direction appropriate to increase the timing angle, with the comparison process starting anew to see whether the new value of the timing angle is in band. If the timing angle was too high, the high value relay 114 would be activated in such a manner as to have the servo-mechanism rotate the injection pump in the opposite direction, thus, lowering the timing angle, with the same re-calculation and re-comparison process again following. The above process, when complete, has calculated the timing angle and the RPM, compared the RPM with the desired range, and if the RPM is in the desired range, used the value of the timing angle to adjust the injection pump to obtain the desired timing angle after which the injection pump fastening means re-tightened. The servomechanism and its control circuitry may be eliminated and the adjustment done by hand if it is used manually.

A timing self-test, which can be selected by the mode switch 103, supplies pulses representing top dead center, encoder and pressure, which would be used in place of the signals coming from the signal conditioners 45, 46. Under these conditions certain numbers should be displayed on the timing angle display 78 and on the RPM display 95. This provides for an easy way to insure that the system is working properly.

It should be understood that in timing a diesel engine, it is very desirable to take the reading from the cylinder being timed more than once, and then average the readings to get a more stable result. This is done for several reasons. First, a diesel engine, like other internal combustion engines, is not a uniform speed device, but actually the speed of the engine from one RPM to the next may vary by as much as 5%. Therefore, you would be depending on a single reading, not necessarily getting a reliable one, if only one reading was taken.

Secondly, in timing a diesel engine, unlike the timing of a gasoline engine, your reading is influenced by a much larger number of factors than in a gasoline engine. In a gasoline engine, such as discussed in U.S. Pat. No. 3,697,865, you would have a definite spark occurrance to begin counting pulses from, and a definite top dead center signal to stop your count of pulses. While in the diesel engine, there is a definite top dead center signal to stop your pulses, you are relying on a pressure signal to begin your count of pulses. That pressure signal is subject to all the problems previously described, together with delays in the pressure reaching the transducer 43 because of hydraulic delays in the fuel traveling from the injection pump 111, through the fuel lines to the injector 44. All of these reasons make it very desirable to average the reading from a single cylinder over several cycles of the engine. For this purpose a number of averages switch 101 is provided, whereby you can average the timing angle of the particular dylinder being timed over 1, 2, 4, 8, 16 or 32 cycles of the engine, with it being understood that one cycle of the engine is equal to two revolutions of the engine.

To do this, additional circuitry, such as that shown in FIG. 17, is provided in the averaging unit 122. The start signal and the encoder pulses from the control unit 50 are fed into the AND gate 115 such as the Model No. 7408, as manufactured by the National Semi-Conductor Corporation. The AND gate operates in such a manner that pulses are let through only when both inputs are high. That means that even though the encoder pusles are constantly providing a high input to the AND gat, they will not be let through the AND gate until a start signal is supplied. When this start signal is supplied, the output of the AND gate, assuming that the start signal is of a continual high value until a stop signal is supplied, is a wave form similar to that of the encoder pulses. This wave form is fed into a binary counter 116A and a multiplexer 117A which, together, form the equivalent of a frequency divider which will divide the number of encoder pulses by N, with N equalling the number of averages set on the number of averages switch. Simultaneously with the number of encoder pulses being divided by the value of N, it is necessary for the averaging unit to continue to count pulses for N number of cycles. To do this, the stop signal is again fed into a binary counter 116B and multiplexer 117B, whose effect is again to form a frequency divider which divides the number of stop pulses by the number of averages N. You will now have a stop signal equal to 1/N of the actual number of stop pulses, and an encoder pulse output from the frequency divider equal to 1/N of the actual number of encoder pulses. With the number of stop pulses being scaled down, when the Nth stop pulse is let through, the number of encoder pulses which are ready to be sent to the display, is equal to 1/N times the number of pulses which have actually occurred. Thus, after the Nth stop pulse, the number of pulses coming from the frequency divider goes directly to the up-down counter 59. After the Nth stop pulse has occurred, the signal from the frequency divider is supplied both to a timer 118 and to a first single shot monostable multi-vibrator 119. The signal from the first single shot tells the counter to display the timing angle. The output of the timer is supplied to a second single shot 120, and the output of the second single shot re-sets the counter so that it will be ready for the next cycle.

The output of the averaging unit consists of three signals also. These would be the display signal, the re-set counter signal, an the encoder pulse signal, all of which are supplied to the up-down counter 59. If the averaging is not desired, the AND gate 115, timer 118 and single shots 119, 120 are included in the control unit 50. In addition, if the control unit 50 is used in which the lockout is based on an angle, a re-set count will be supplied to the up-down counter 59. The basic function of the counter is to count encoder pulses which are being supplied from the averaging unit. The counter may be such as Model 2303 manufactured by the Electronic Research Company, Shawnee Mission, Kansas, or any other suitable unit.

The counter will continue counting pulses until the display signal is supplied from the averaging unit, at which time it will supply such a signal to the timing display 78 and also to the dual timing comparator 79. After a short delay from the timer in the averaging unit, the counter is re-set by the next set counter signal, and made ready for the next cycle.

Referring to FIG. 15, in the system where the lockout period is based on an angle, the counter may be re-set initially before it is signaled to display the true value by virtue of the second re-set counter signal, which will be supplied if a false top dead center signal has to be supplied from the comparator 69. If this occurs, the proper display signal will not be supplied to the counter until the system is in phase and the correct number of pulses are being counted as a result of the proper primary pressure signal being supplied to the single shot monostable multi-vibrator 56D. At this point regardless of whether the timing is high, low, or in band, the value will be displayed on the timing display 78.

It can be seen from the foregoing description that my invention not only provides a method and apparatus for finding the timing angle of a diesel engine, but provides such a method and apparatus which is capable of being used in many ways and in many forms. The basic system shown in FIG. 7 provides for finding the timing angle and displaying the same, whether based on a fixed time period lockout or two types of lockout periods based on degrees of crankshaft rotation.

As shown in FIG. 8, my invention also contemplates continually monitoring the RPM of the engine and displaying the same, whether the RPM is high, low or in band in regard to the specification supplied by the diesel engine manufacturer for the timing operation, and as shown in FIG. 9, can also be extended to automatically adjust the injection pump 111, and thus, time the diesel engine itself.

Figure 3:
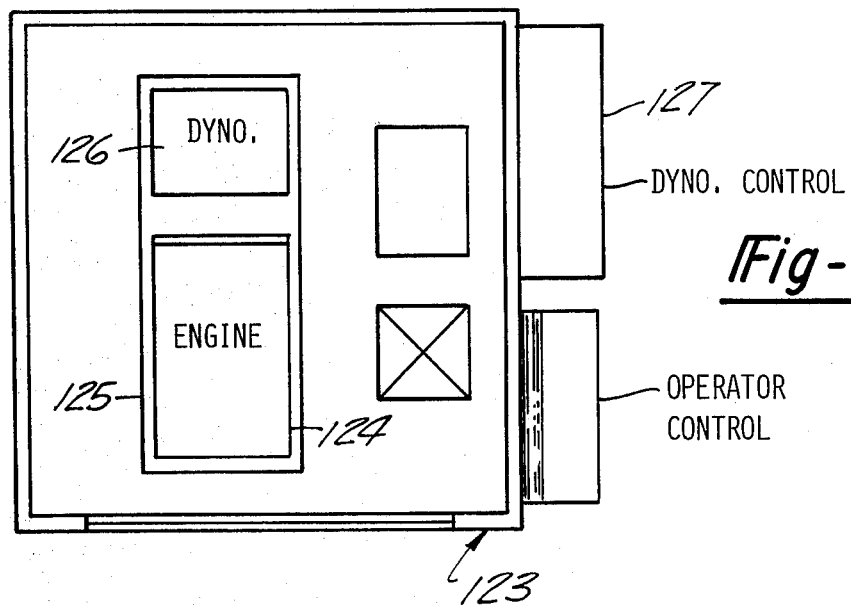
FIG. 3 is a plan view of the typical diesel engine test cell in which the diesel engine timing system embodying the construction of the present invention may be installed.
Figure 4:
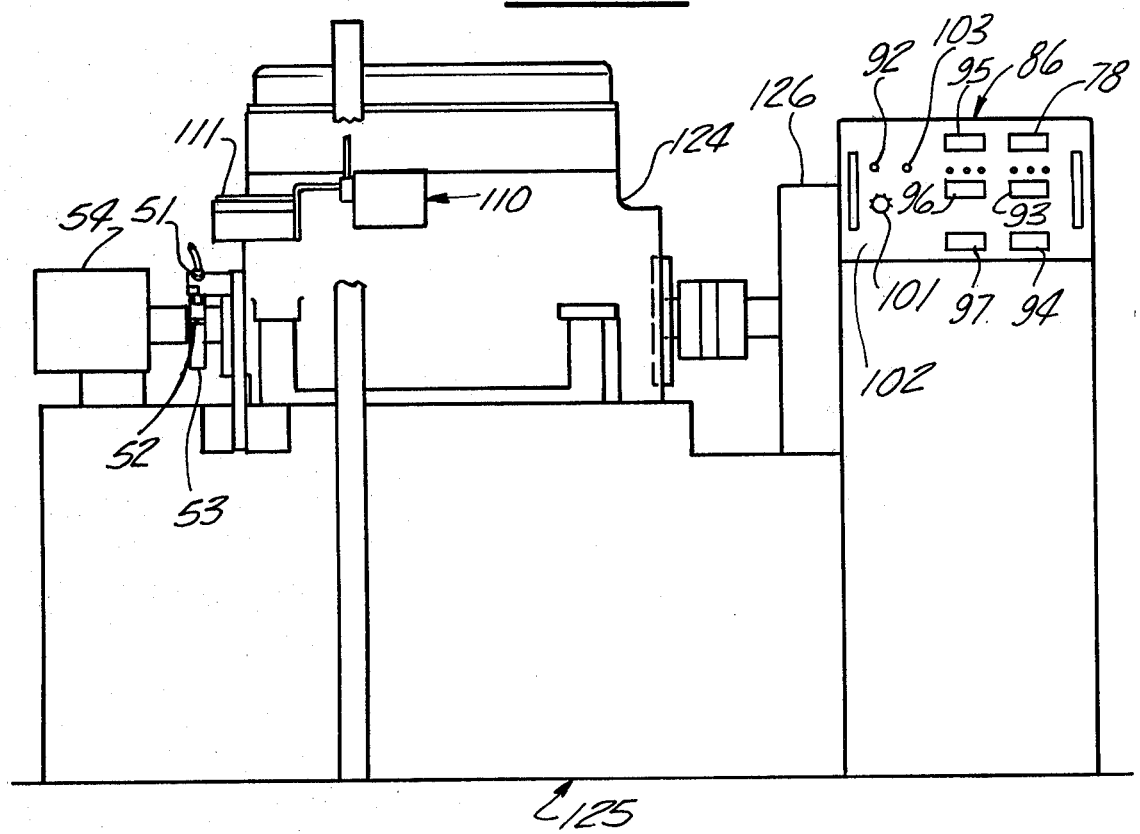
FIG. 4 is an elevational view of an engine and dynamometer which may be the same as installed in the test cell of FIG. 3.

Also, all of the above may be done with or without the provisions for averaging a number of timing readings. In addition to the great variety of functions which can be performed by my invention, it can be used in a great variety of ways, all the way from the factory production line to the corner garage. Referring to FIGS. 3 and 4, since the current diesel engine production rates, which are relatively low compared with production rates of gasoline spark ignited engines, it is envisioned that the present invention would be used in a diesel engine test cell, generally designated by the numeral 123. Such test cells generally have an engine 124 mounted on a test stand 125 and connected to a dynamometer 126 for loading the engine to simulate different loads at different RPM's. The dynamometer 126 is controlled by a dynamometer control 127. The appearance of the engine dynamometer combination 125, 126 may be that as shown in an enlarged scale in FIG. 4. In FIG. 4 there can be plainly seen the encoder 54 being attached to the engine damper 53, and the magnetic pick-up 51 cooperating with the notch 52 in the engine damper. Also, there can be seen a servo-mechanism 110 operatively engaged to the injection pump 111 for timing the diesel engine. The present invention is shown embodied in a cabinet 86, which may be similar to that shown in FIG. 1, mounted on the control stand 125. It is contemplated that as the increased advantages of the diesel engines become apparent, such as high fuel economy and low pollution level, the production rate of diesel engines may increase dramatically, at which time an even faster testing rate than available with a diesel engine test cell will be necessary. Referring to FIG. 5, such production testing rates may be accomplished by providing a plurality of test stands 125 about a conveyor generally designated by the numeral 129 such as described in the U.S. Pat. Nos. 3,631,967 and 3,524,344. Such a conveyor provides means 130 for loading the engine on to the conveyor, automatically testing the diesel engine in one of the test stands 125 and means 131 to automatically unload the engine after testing. Additional operations may be performed on the engine, as provided for by additional test stands, or other means around the conveyor designated by the numeral 128.

Thus, by abandoning the old, slow, and cumbersome method of timing a diesel engine by the mechanical "timing" of the injection pump, timing gear, camshaft, and crankshaft, all of which, when in perfect relationship, would provide a timing angle which hopefully was somewaht near the intended one, and by inventing a method and apparatus for timing a diesel engine which utilizes a pressure signal from a pressure transducer mounted in the fuel line going to the number one or other selected cylinder, I have achieved all the objects listed above, as well as numerous additional advantages.

I claim:

1. A method of determining the timing angle of a single cylinder of a diesel internal combustion engine having at least one cylinder and an injection pump, with each cylinder having a piston, a fuel injector, and a corresponding fuel line communicating with said fuel injector, and said piston having a crankshaft connected thereto, selecting the single cylinder to be time, continuously monitoring the fuel pressure, including the related primary and secondary pressure waves occurring in the fuel line associated with said single cylinder, producing a signal each time the pressure in said fuel line reaches a predetermined pressure, locking out all subsequent pressure signals caused by said secondary pressure waves in a predetermined manner for a period not to exceed the next occurring primary pressure signal, continuously producing pulses of a predetermined and uniform angular frequency, producing a top dead center signal related to the moment the piston in said single cylinder reaches its top dead center position, continuously counting said uniform pulses from the moment of the occurrence of the pressure signal occurring immediately before the first of said subsequent locked out pressure signals to the moment of said top dead center signal, and relating said count of pulses to the timing angle of said engine, and if said pressure signal occurring immediately before the first of said locked out pressure signals is not primary pressure signal repeating said process until said signal is a primary pressure signal, thereby finding the timing angle of said engine.

2. The method defined in claim 1, and including the step of displaying the value of said timing angle.

3. The method defined in claim 2, and including the steps of comparing the timing angle with predetermined upper and lower timing angle limits, and indicating whether said timing angle is high or low, and therefore unacceptable, or is in band, and therefore acceptable in relation to said limits.

4. The method defined in claim 3, and including the step of calculating the RPM of the engine utilizing said uniform angular pulses.

5. The method defined in claim 4, and including the step of displaying the value of the RPM.

6. The method defined in claim 5, and including the steps of comparing the calculated RPM with predetermined RPM limits, and indicating whether said calculated RPM is high or low, and therefore unacceptable, or is in band, and therefore acceptable with regard to said limits.

7. The method defined in claim 6, and including the steps of comparing said calculated RPM with said predetermined RPM limits, and if said calculated RPM is within said limits, comparing the said timing angle with said predetermined timing angle limits, and if said timing angle is high, rotating said injection pump in an appropriate direction to lower said timing angle, and if said timing angle is low, rotating said injection pump in a second appropriate direction to raise said timing angle, continuing said comparison and adjusting processes until said timing angle is in band, and thus, automatically adjusting the timing angle of said diesel engine to a desired acceptable timing angle.

8. The method defined in claim 7, and including the step of obtaining the measurement of the timing angle repeatedly over a pre-selected number of revolutions and obtaining the average of the values obtained for the timing angle measurements.

9. The method defined in claim 8, with the lockout of said certain undesirable pressure signals being accomplished by locking out said subsequent pressure signals for a predetermined time based on the speed of the engine such that if said initial signal is a primary pressure signal, all secondary pressure signals after said primary pressure signal will be locked out, and the timing angle will be measured from the primary pressure signal to the next subsequent top dead center signal, and if said method of measuring said timing angle does not start at a time when said initial signal is a primary pressure signal, the time period chosen will be such that the system will back up and lock in on the primary pressure signal.

10. The method defined in claim 8, wherein the lockout of certan subsequent pressure signals is performed by locking out all pressure signals occurring after said pressure signal for a period related to the degrees of rotation of said crankshaft, with said number of degrees being equal to the degrees of crankshaft rotation which take place between said signal and a second subsequent top dead center signal such that if said method is applied beginning with a primary pressure signal, the timing angle will be correctly measured regardless of the RPM of the engine, and if said signal is a secondary pressure signal, a false top dead center signal will be generated after a predetermined number of degrees with said lockout period then continuing to the next subsequent top dead center signal, thereby locking out all other secondary pressure signals before the next subsequent primary pressure signal and thereby allowing the next pressure signal from which said pulses are counted to be a primary pressure signal, with the system now being in phase, and measuring the correct timing angle regardless of engine RPM.

11. The method defined in claim 10, wherein said predetermined number of degrees is equal to 50° of crankshaft rotation.

12. The method defined in claim 8, wherein the lockout of certain subsequent pressure signals takes place for an extended period related to the degrees of rotation of said crankshaft, not to exceed 720°, with said number of degrees being sufficient to assure that all secondary pressure signals have subsided, such that if said method is applied beginning with a primary pressure signal, all secondary pressure signals are locked out, and if said method is applied beginning with a secondary pressure signal, all other secondary pressure signals before the next primary pressure signal will be locked out, with the next timing angle measurement then beginning with said primary pressure signal, thereby assurring the correct measurement of timing angle from that point on.

13. The method defined in claim 12, wherein the lockout period is equal to 540° of crankshaft rotation.

14. The method defined in claim 1, and including the step of obtaining the measurement of the timing angle repeatedly over a pre-selected number of revolutions, and obtaining the average of the values obtained for the timing angle measurements.

15. The method defined in claim 1, with the lockout of said certain undesirable pressure signals being accomplished by locking out said subsequent pressure signals for a predetermined time based on the speed of the engine such that if said initial signal is a primary pressure signal, all secondary pressure signals after said primary pressure signal will be locked out, and the timing angle will be measured from the primary pressure signal to the next subsequent top dead center signal, and if said method of measuring the timing angle does not start at a time when said initial signal is a primary pressure signal, the time period chosen will be such that the system will back up and lock in on the primary pressure signal.

16. The method defined in claim 1, wherein the lockout of certain subsequent pressure signals is performed by locking out all pressure signals occurring after said pressure signal for a period related to the degrees of rotation of said crankshaft, with said number of degrees being equal to the degrees of crankshaft rotation which take place between said signal and a second subsequent top dead center signal such that if said method is applied beginning with a primary pressure signal, the timing angle will be correctly measured regardless of the RPM of the engine, and if said signal is a secondary pressure signal, a false top dead center signal will be generated after a predetermined number of degrees, with said lockout period then continuing to the next subsequent top dead center, thereby locking out all other secondary pressure signals before the next subsequent primary pressure signal, and thereby allowing the next pressure signal from which said pulses are counted to be a primary pressure signal, with the system now being in phase, and measuring the correct timing angle regardless of engine RPM.

17. The method defined in claim 16, wherein said predetermined number of degrees is equal to 50° of crankshaft rotation.

18. The method defined in claim 1, wherein the lockout of certain subsequent pressure signals takes place for an extended period related to the degrees of rotation of said crankshaft, not to exceed 720°, with said number of degrees being sufficient to assure that all secondary pressure signals have subsided, such that if said method is applied beginning with a primary pressure signal, all secondary pressure signals are locked out, and if said method is applied beginning with a secondary pressure signal, all other secondary pressure signals before the next primary pressure signal will be locked out, with the next timing angle measurement then beginning with said primary pressure signal, thereby assurring the correct measurement of timing angle from that point on.

19. The method defined in claim 18, wherein the lockout period is equal to 540° of crankshaft rotation.

20. An apparatus for determining the timing angle of a single cylinder of a diesel internal combustion engine having at least one cylinder and an injection pump, with each cylinder having a piston, a fuel injector, and a corresponding fuel line communicating with said fuel injector, and a corresponding fuel line communicating with said fuel injector, and said piston having a crankshaft connected thereto, said apparatus including means for continuously monitoring the fuel pressure, including the related primary and secondary pressure wave, occurring in the fuel line associated with said single cylinder, means for producing a signal each time the pressure in said fuel line reaches a predetermined pressure, means for locking out all subsequent pressure signals caused by said secondary pressure waves in a predetermined manner for a period not to exceed the next occurring primary pressure signal, means for continuously producing pulses of a predetermined and uniform angular frequency, means for producing a top dead center signal related to the moment the piston in said single cylinder reaches its top dead center position, means for continuously counting said uniform pulses from the moment of the occurrence of the pressure signal occurring immediately before the first of said subsequent locked out pressure signals to the moment of said top dead center signal, means for relating said count of pulses to the timing angle of said engine, and if said pressure signal occurring immediately before the first of said locked out pressure signals is not a primary pressure signal, means for repeating said process until said signal is a primary pressure signal, thereby finding the timing angle of said engine.

21. The apparatus defined in claim 20, wherein the means to produce said top dead center signal is in the form of a magnetic pick-up cooperating with a notch in the harmonic damper of said engine.

22. The apparatus defined in claim 20, wherein the means for producing said top dead center signal is in the form of a photoelectric device cooperating with a notch in the harmonic damper of said engine.

23. The apparatus defined in claim 20, wherein the means to produce said top dead center signal is in the form of a photoelectric device cooperating with a hole provided in the harmonic damper of said engine.

24. The apparatus defined in claim 20, wherein the means to produce said top dead center signal is in the form of a magnetic pickup cooperating with a protrusion on the harmonic damper of said engine.

25. The apparatus defined in claim 20, wherein the means to produce said top dead center signal is in the form of a photoelectric device cooperating with a protrusion on the harmonic damper of said engine.

26. The apparatus defined in claim 20, wherein the means to continuously monitor said fuel pressure is in the form of a pressure transducer inserted in said fuel line.

27. The pparatus defined in claim 26, wherein said means to produce a pressure signal each time said pressure in said fuel line reaches a predetermined pressure include a first type of signal conditioner connected to said pressure transducer by means of an appropriate electrical connection.

28. The apparatus defined in claim 27, wherein said first type of signal conditioner is in the form of a Schmitt trigger.

29. The apparatus defined in claim 27, wherein the means for continuously producing pulses of a predetermined and uniform angular frequency is in the form of an encoder, and a second type signal conditioner connected to said encoder.

30. The apparatus defined in claim 29, and including a second type of signal conditioner connected to said means for producing said top dead center signal to convert said signal into a form compatable with the system.

31. The apparatus defined in claim 30, and including a control unit to provide the proper lockout period.

32. The apparatus defined in claim 31, and including an updown counter suitably connected to said control unit to count said pulses from the moment of said pressure signal to the occurrance of said top dead center signal.

33. The apparatus defined in claim 32, and including a display unit to give a visual read-out of the timing angle.

34. The apparatus defined in claim 33, including a dual timing comparator connected to said up-down counter and adapted to compare said timing angle with predetermined timing limits and adapted to indicate by means of appropriately connected indicator lights whether said timing angle is high or low, and therefore unacceptable, or is in band, and therefore acceptable, in relation to said timing limits.

35. The apparatus defined in claim 34, and including a frequency divider connected to the second type signal conditioner connected to said encoder, and a frequency counter connected to said frequency divider, both adapted to calculate the RPM of the engine from the uniform angular pulses supplied by the encoder.

36. The apparatus defined in claim 35, and including a display unit to give a visual read-out of the RPM of the engine being tested.

37. The apparatus defined in claim 36, including a dual RPM comparator connected to said frequency counter to compare the calculated RPM with a predetermined range of RPM, and to blank out the timing angle display, if desired, if the RPM is not in the predetermined range, and adapted to indicate by appropriately connected indicator lights whether the timing is high or low, and therefore unacceptable, or is in band, and therefore acceptable, in relation to said predetermined RPM limits.

38. The apparatus defined in claim 37, and including a servo-mechanism control connected to said dual RPM comparator and adapted to control a servo-mechanism which can be operatively connected to said injection pump, all adapted to adjust the injection pump to produce a desired timing angle.

39. The apparatus defined in claim 38, wherein the control unit is adapted to provide a lockout period based on a fixed time interval, and including a single shot adapted to receive the conditioned signal from the pressure transducer, an R-S flip flop, one of whose inputs is connected to said single shot, a single shot and a timer connected to the output of said R-S flip flop, with the output of said timer connected to the other input of said R-S flip flop, a single shot adapted to receive the conditioned pulses from the top dead center signal producing means, and means to transmit said encoder pulses.

40. The apparatus defined in claim 39, and including an averaging unit interposed between said control unit and said up-down counter for the purposes of repetitively measuring the timing angle over a predetermined number of cycles and averaging the reading so obtained, to obtain the average timing angle of the cylinder of said diesel engine.

41. The apparatus defined in claim 38, wherein the control unit includes a single shot adapted to receive the conditioned signals from said pressure transducer, and an OR gate having one of its inputs adapted to receive the conditioned signals from the top dead center signal producing means, a timing angle comparator having an output forming the second input of said OR gate, another single shot connected to the output of said OR gate, a J-K flip flop connected to the high output of the single shot connected to the OR gate, a three input AND gate whose inputs are the single shot connected to receive said pressure signals, the low output of the single shot connected to the OR gate, and the output of said J-K flip flop, and an R-S flip flop connected to said AND gate and to said single shot connected to said OR gate, all adapted to provide an initial angle check and a lockout independent of the speed of the engine, and being based on degrees of rotation of the crankshaft of said engine, with said angle check being substantially equal to the largest contemplated timing angle of the engine.

42. The apparatus defined in claim 41, and including an averaging unit interposed between said control unit and said counter.

43. The apparatus defined in claim 42, and including a first frequency divider adapted to receive the stop count signal from said control unit, a second frequency divider adapted to receive the start count and encoder pulse signal from said control unit, an AND gate interposed between said control unit and said frequency divider, a single number of averages switch connected to both of said frequency dividers, a single shot and a timer connected to the output of said first frequency divider, and a single shot connected to the output of said timer, all adapted to measure the timing angle of a single cylinder of said engine a predetermined number of times, and to average the reading so obtained, thereby obtaining the average timing angle of one cylinder of said diesel internal combustion engine.

44. The apparatus defined in claim 38, wherein the control unit includes single shots adapted to receive the conditioned signals from the said pressure monitoring means and said top dead center signal producing means, and both being of the same output type, a dual input AND gate having one of said inputs connected to said pressure single shot, a second counter adapted to receive the signals from the encoder and also being connected to the output of said AND gate, a first comparator and a second comparator connected to the output of said second counter, and an inverter interposed between said second comparator and the second input of said AND gate, and all being adapted to provide a fixed lockout based on degrees of rotation of said crankshaft such that all secondary pressure signals occurring after said pressure signal and before said subsequent primary pressure signal will be locked out.

45. The apparatus defined in claim 44, and including an averaging unit interposed between said control unit and said counter.

46. The apparatus defined in claim 45, and including a first frequency divider adapted to receive the stop count signal from said control unit, a second frequency divider adapted to receive the start count and encoder pulse signal from said control unit, an AND gate interposed between said control unit and said frequency divider, a single number of averages switch connected to both of said frequency dividers, a single shot and a timer connected to the output of said first frequency divider, and a single shot connected to the output of said timer, all adapted to measure the timing angle of a single cylinder of said engine a predetermined number of times, and to average the reading so obtained, thereby obtaining the average timing angle of one cylinder of said diesel internal combustion engine.

47. The apparatus defined in claim 33, and including a mode switch connected to said control unit and adapted to perform an internal test of the system.

48. The apparatus defined in claim 33, and including a frequency divider connected to the second type signal conditioner connected to said encoder, and a frequency counter connected to said frequency divider, both adapted to calculate the RPM of the engine from the uniform angular pulses supplied by the encoder.

49. The apparatus defined in claim 48, and including a display unit to give a visual read-out of the RPM of the engine being tested.

* * * * *